US005798733A

United States Patent [19]
Ethridge

[11] Patent Number: 5,798,733
[45] Date of Patent: Aug. 25, 1998

[54] INTERACTIVE POSITION GUIDANCE APPARATUS AND METHOD FOR GUIDING A USER TO REACH A PREDETERMINED TARGET POSITION

[75] Inventor: Jeffrey Noel Ethridge, Greenbelt, Md.

[73] Assignee: Northrop Grumman Corporation, Los Angeles, Calif.

[21] Appl. No.: 784,639

[22] Filed: Jan. 21, 1997

[51] Int. Cl.$^6$ ............................ G01S 5/02; H04B 7/185
[52] U.S. Cl. .................. 342/357; 701/211; 701/209; 701/213
[58] Field of Search ................ 364/449.1, 449.3, 364/449.5, 449.7, 449.8; 342/357

[56] References Cited

U.S. PATENT DOCUMENTS

| | | | |
|---|---|---|---|
| 4,937,751 | 6/1990 | Nimura et al. | 364/449 |
| 4,989,151 | 1/1991 | Nuimura | 364/449 |
| 5,031,104 | 7/1991 | Ikeda et al. | 364/449 |
| 5,043,902 | 8/1991 | Yokoyama et al. | 364/449 |
| 5,115,399 | 5/1992 | Nimura et al. | 364/449 |
| 5,184,123 | 2/1993 | Bremer et al. | 340/995 |
| 5,191,532 | 3/1993 | Moroto et al. | 364/449 |
| 5,201,482 | 4/1993 | Ream | 244/145 |
| 5,231,584 | 7/1993 | Nimura et al. | 364/444 |
| 5,394,332 | 2/1995 | Kuwahara et al. | 364/449 |
| 5,452,217 | 9/1995 | Kishi et al. | 364/449 |

OTHER PUBLICATIONS

John Rhea; "Wearable Computer Used in Bosnia"; Jul. 1996; *Military & Aerospace Electronics*; vol. 7, No. 7.
Bennett Daviss; "Shot in the Dark"; 21 Sep. 1996; *New Scientist*; pp. 43–45.

*Primary Examiner*—Thomas H. Tarcza
*Assistant Examiner*—Dao L. Phan
*Attorney, Agent, or Firm*—Walter G. Sutcliff

[57] ABSTRACT

A position guidance apparatus is a microprocessor based tool used to aid a parachute jumper in reaching a predetermined target position in an interactive manner. The device is particularly valuable in aiding those who have to do parachute jumps under hazardous conditions such as at night, into terrain with no visible orientation features, or into terrain wherein a precisely located landing is desired. The position guidance apparatus provides locational/directional guidance in a visual and potentially audible manner to guide the user in steering himself into an appropriate targeted landing zone. The apparatus is one that is preferably strapped onto the forearm of a user and provides a small graphical display of current position, target position, and predicted destination position. Alternatively, the display can be implemented as a heads-up display for the user. The display further relays instruction information to the user to vary the predicted destination position and thereby minimize deviation from a predetermined target position.

62 Claims, 16 Drawing Sheets

FIG.1
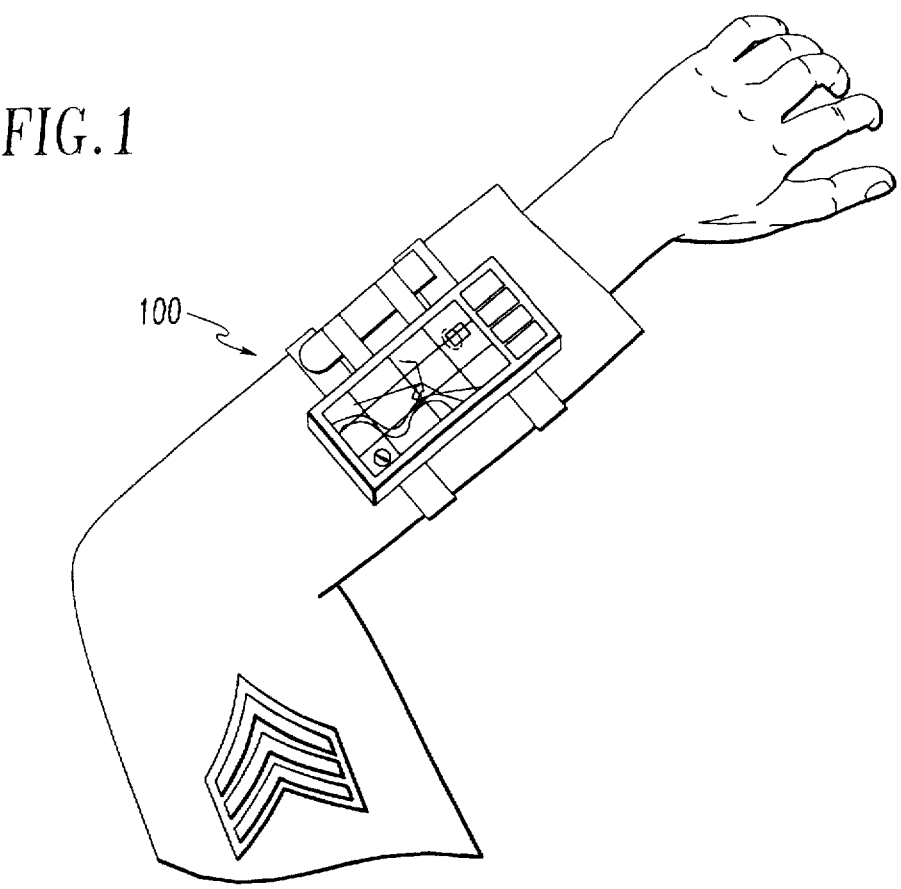
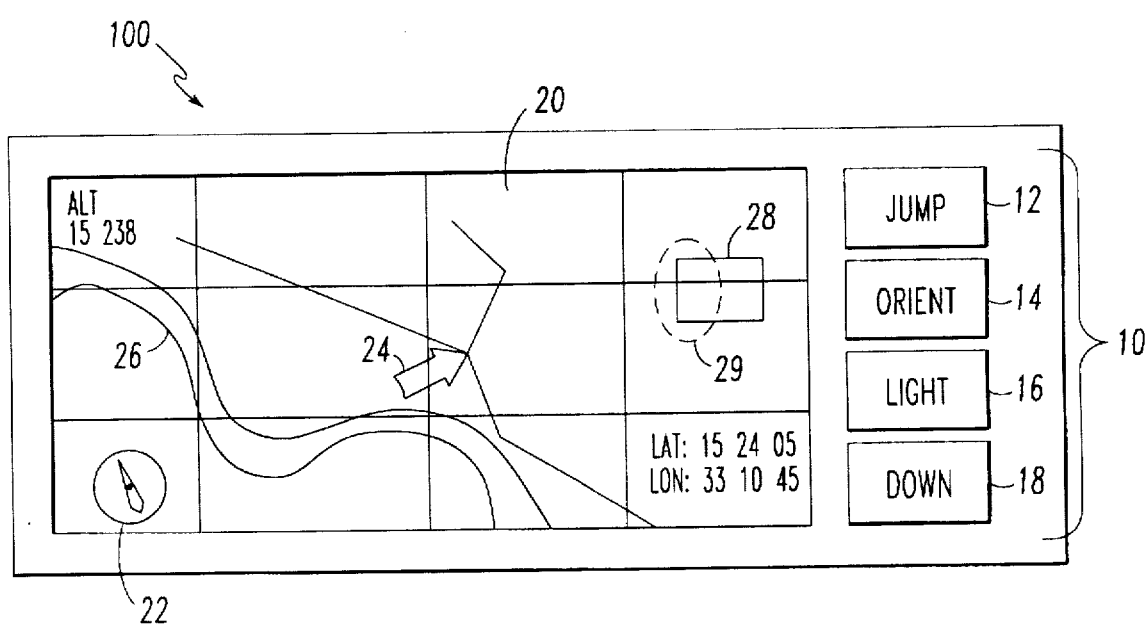
FIG.2

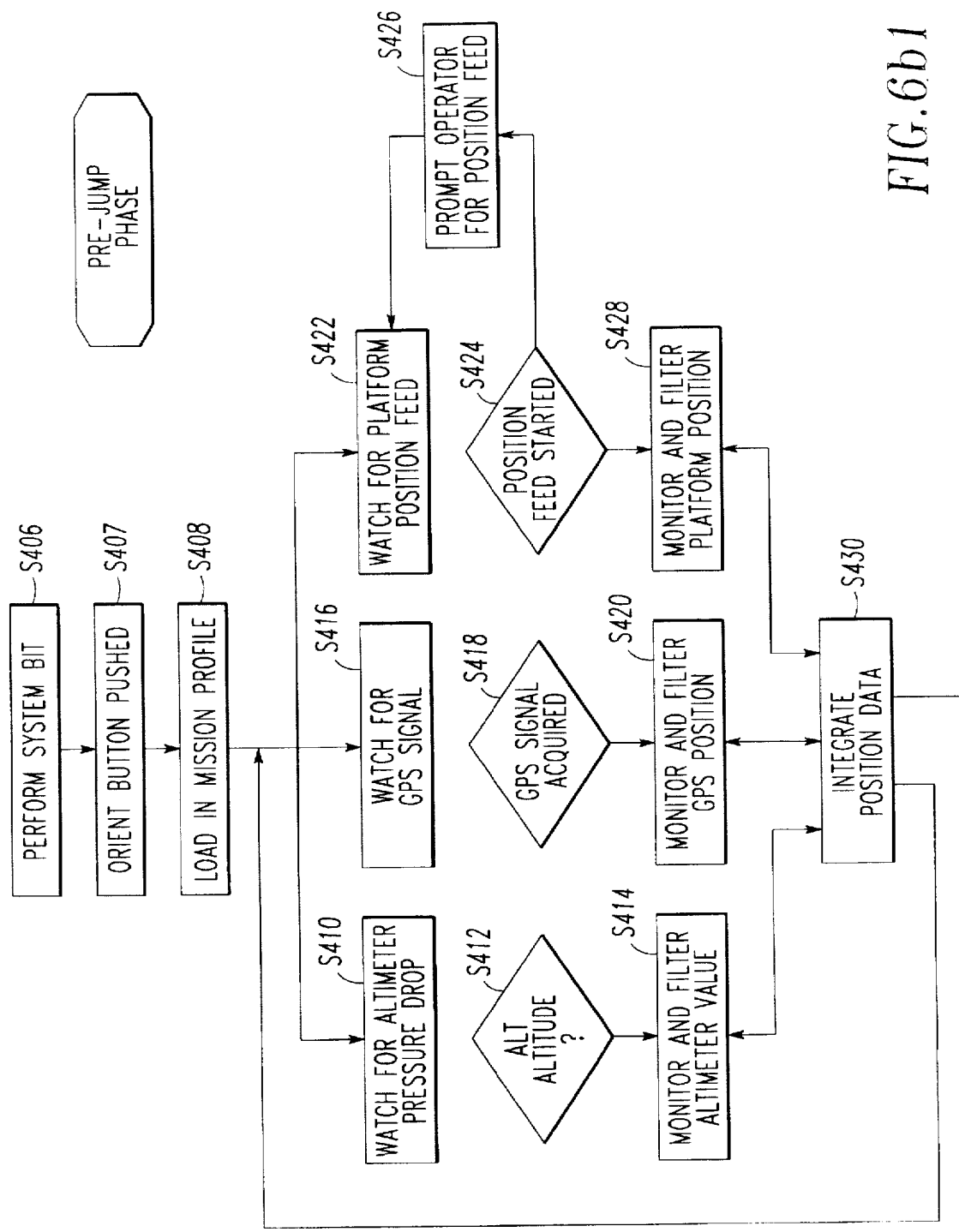
FIG.6b1

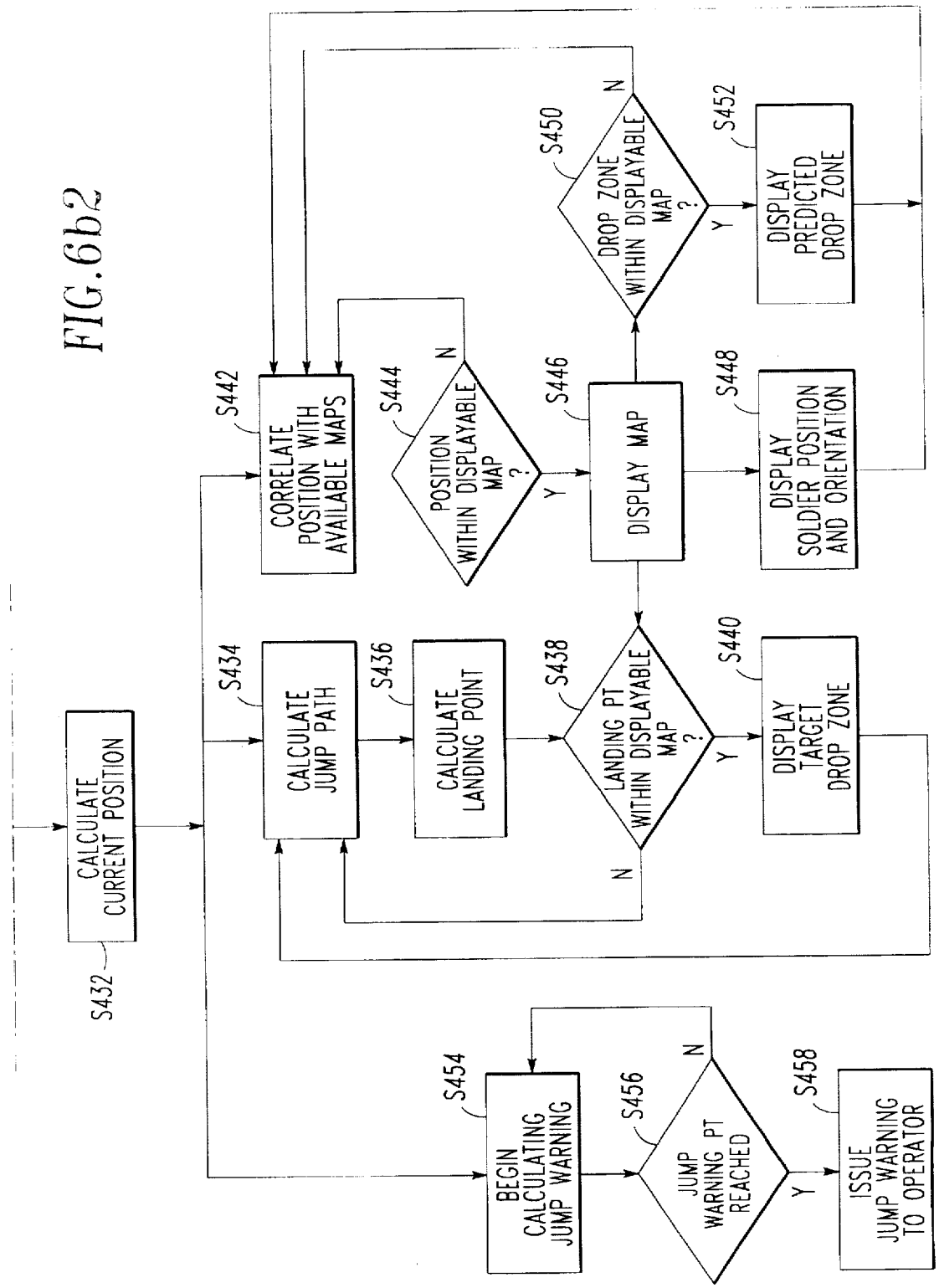
FIG.6b2

FIG.7
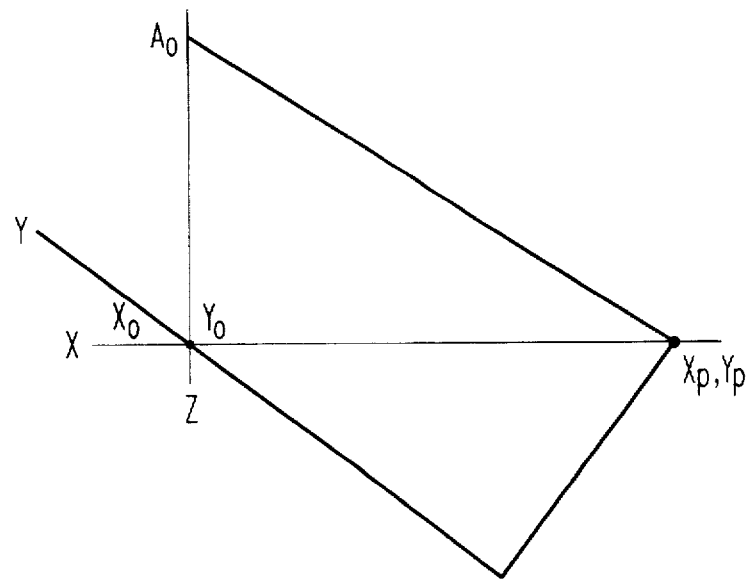
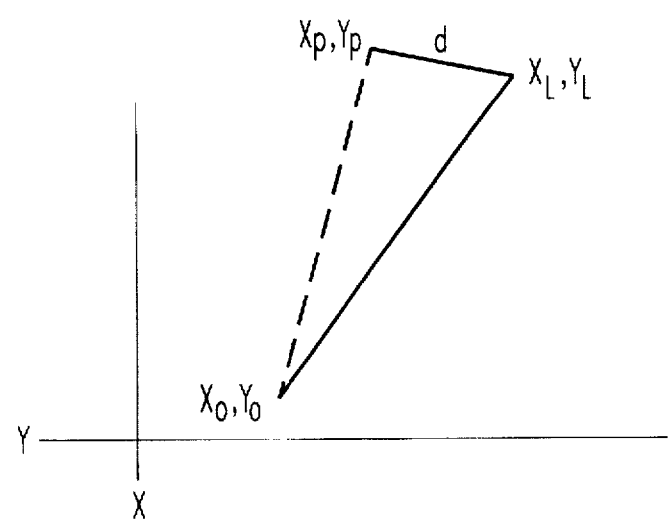
FIG.8

FIG.12a
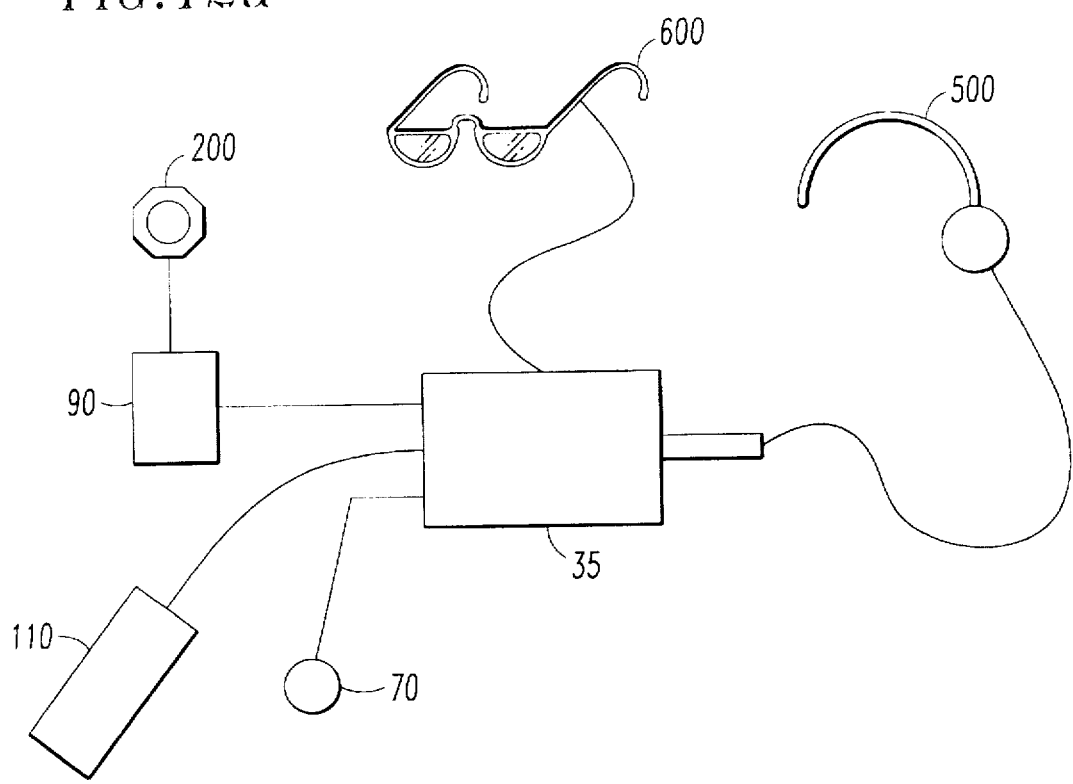
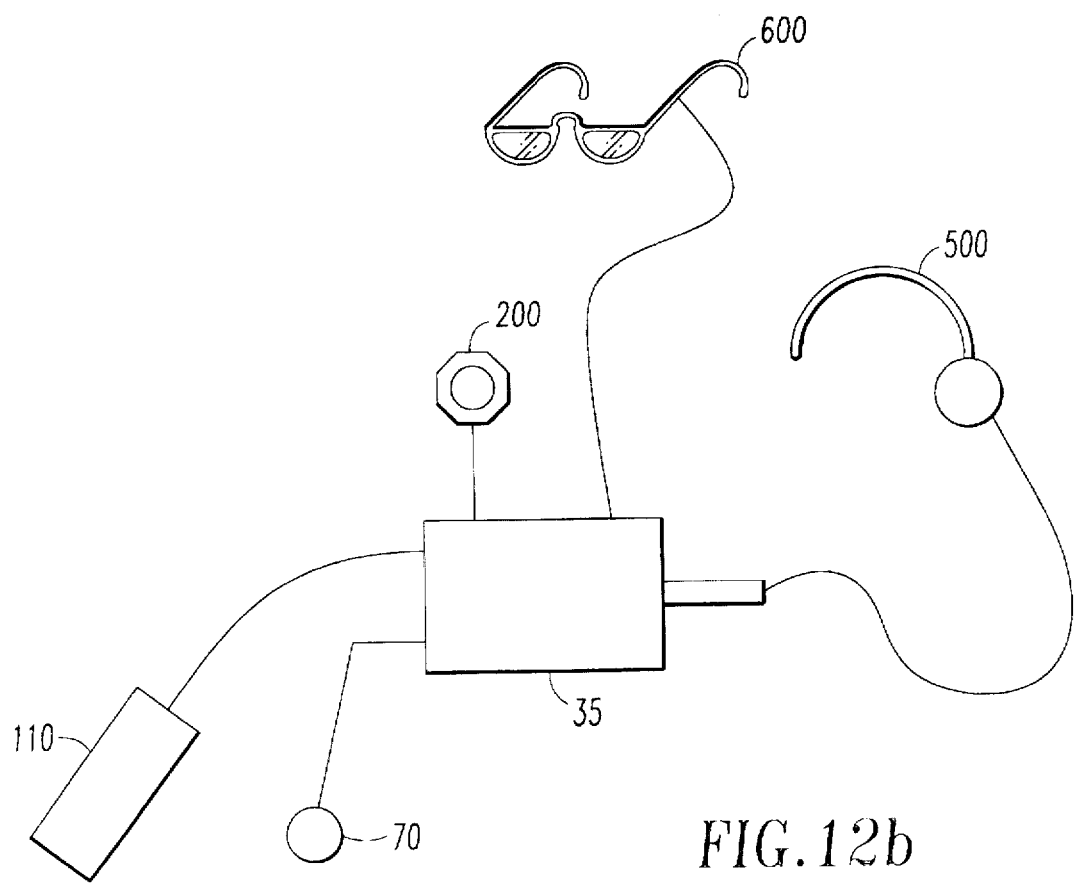
FIG.12b

INTERACTIVE POSITION GUIDANCE APPARATUS AND METHOD FOR GUIDING A USER TO REACH A PREDETERMINED TARGET POSITION

BACKGROUND OF THE INVENTION

In the past, large computer systems were used in combination with radar and sonar apparatuses for position guidance. These large computer systems were located, for example, on the airplane and aided in guiding the airplane when visibility became a problem, such as during violent storms or nighttime operations. For military applications, however, the on-board computer guidance systems provided adequate guidance for the plane itself. However, while providing a parachute jumper or Navy SEAL with a predictable starting location, it could not aid the parachute jumper or SEAL in reaching a desired target position on the ground. In other words, the Navy SEALs or parachute jumpers, when jumping at night for example, were basically jumping blind from a high altitude, relying only on an altimeter and dead reckoning from the airplane itself.

Recently, the U.S. military services have begun developing some computing devices which are mountable on U.S. Army soldiers and Navy SEALs. As disclosed in the article entitle "Wearable Computer Used in Bosnia", printed in the July 1996 *Article of Military and Aerospace Electronics*, one such computer device used for the Navy SEAL was worn in a two pound belt, for example, that enabled service personnel to interface with a variety of peripherals, including voice input/output systems. One such system discussed in the article included voice recognition software that translated simple phrases into another language. The article further discussed that the Navy used such an on-man computer to reduce time needed to check out a diving vehicle, and that the Air Force used such a system to help accomplish a routine aircraft maintenance task such as changing the oil in the jet engines. With regard to the Army, the article "Shot in the Dark", published in the Sep. 21, 1996 issue of *New Scientist Magazine*, indicates the Army has also begun developing on-man computers for use in developing night vision systems and for thermal sensors.

However, although the military has recognized that it is possible to utilize on-man computers which can be mounted on, or carried by a soldier, for example, the problem of weighing a soldier down with excess baggage has discouraged much of the development. Most existing on-man computer devices have been made with what the military calls commercial off the shelf components (COTS), and have been used to enhance a soldiers vision or to enhance the ability to see a target when on the ground. The aspect of position guidance, both through the air and on the ground, has basically been unexplored.

SUMMARY OF THE INVENTION

An object of the present application is to provide location/directional guidance to a parachute jumper who jumps into terrain with no visible orientation features, or where a precisely located landing is desired.

A further object of the present application is to provide a precision guidance device which is light in weight and can be easily worn on an appendage, such as a forearm of the user.

A yet further object of the present application is to provide an interactive position guidance to guide a user in making in-flight adjustments to land at a predetermined target position.

A still further object to the present application is to provide a user with instructions regarding how to make in-flight adjustments in direction and velocity to reach a target position.

An even further objection of the present application is to provide a user with a predetermined target position, a constantly updated current position, and a constantly updated predicted destination position so that a user can view how a predicted destination position is being adjusted with respect to a desired target position.

The aforementioned and further objects of the present application are achieved by providing a position apparatus, comprising:

first means for prestoring position information;

second means for receiving input position information;

third means for determining a target position based upon the prestored position information, for determining current position based upon the received input position information, and for determining a predicted destination position based upon the received input position information and the prestored position information; and display means for displaying the target position, current position and the predicted destination position, wherein the current position and predicted destination position are updated and redisplayed each time the second means receives input position information.

The aforementioned and further objects of the present application are further obtained by providing a position guidance method, comprising the steps of:

prestoring target position information and jump profile information;

receiving input position information;

determining a target position based upon the prestored target position information;

determining a current position based on the received input position information;

determining a predicted destination position based upon the received input position information and the prestored jump profile information; and displaying the determined target position, current position, and predicted destination position, wherein the current position and predicted destination position are redetermined and redisplayed each time input position information is received.

The aforementioned and further objects of the present application are still further obtained by providing an interactive position guidance apparatus for aiding a parachute jumper in reaching a predetermined target position, comprising;

first means for prestoring target position information of the predetermined target position and for prestoring jump profile information;

second means for receiving input position information at predetermined time intervals;

third means for determining, after each predetermined time interval, the current position of the parachute jumper based upon the received input position information and for determining, after each predetermined time interval, the predicted destination of the parachute jumper based upon the received input position information and the prestored jump profile information;

display means for displaying the predetermined target position, the current position, and the predicted destination of the parachute jumper, wherein display of the current position and predicted destination of the parachute jumper is updated after each predetermined time interval; and calculations means for calculating, after each predetermined time interval, a difference between a predetermined target position and the predetermined destination of the parachute jumper, wherein the display means further displays instruction information to the parachute jumper to minimize the calculated difference between the predetermined target position and the predicted destination of the parachute jumper.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, wherein like reference numerals indicate like elements throughout the drawings, and wherein:

FIG. 1 illustrates the position guidance apparatus of an embodiment of the present application strapped to the arm of a user;

FIG. 2 illustrates a top panel view of the position guidance apparatus of the first embodiment of the present application;

FIG. 6b is a flow chart illustrating the details of the position guidance apparatus of the first preferred embodiment of the present application determining pre-jump information;

FIG. 7 is a graph used for calculating a predicted destination position;

FIG. 8 is a graph used for computing a difference between a predicted destination position and a target position;

FIG. 12a illustrates components of an alternative embodiment of a position guidance apparatus of the present application; and FIG. 12b illustrates components of another alternative embodiment of a position guidance apparatus of the present application.

DETAILED DESCRIPTION OF THE PREFERRED EMBODIMENTS

Figure 3:
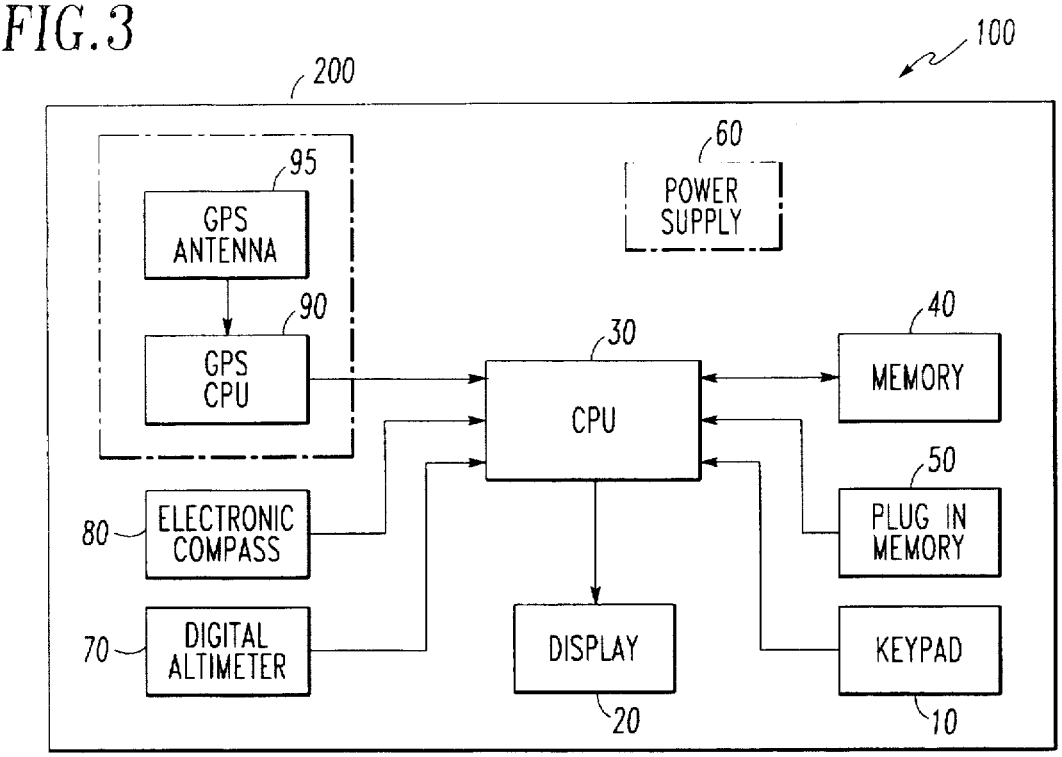
FIG. 3 illustrates the basic components of the position guidance apparatus of the first embodiment of the present application.

FIG. 1 illustrates the position guidance apparatus 100 of a first embodiment of the present application. As can be seen in FIG. 1, the position guidance apparatus 100 is preferably one that is relatively small enough as to be mountable on an appendage of the user. For example, if the user is a parachute jumper, the position guidance apparatus 100 can be strapped onto the forearm of the user. The position guidance apparatus 100 preferably provides a 3×5 inch lighted graphical display, for example, that is easily visible to a user in a manner that does not impede the use of the hands and arms of the user for other needs. It should be noted that the size of the display and attachment of the display to the user is merely exemplary and can be varied in other ways which make the display easily visible to the user.

FIG. 2 of the present application is a top panel view of the position guidance apparatus 100 of a first preferred embodiment of the present application. The top panel view as shown in FIG. 2 illustrates all of the primary functions and data that the parachute jumper user views during a jump for example, or on a continued mission on the ground. The display 20 is preferably a 3×5 inch lighted liquid crystal graphical display as shown in FIG. 2. The display 20 preferably displays the following elements:

magnetic north 22;

the user's current position and direction as indicated by the large black arrow 24;

topical information regarding terrain surrounding a desired landing location, such as a river 26;

the desired drop zone or target position as shown by rectangle 28 in FIG. 2;

a predicted destination position or predicted drop area as shown by the elliptical shape 29 of FIG. 2;

current pressure altitude as shown by the symbol "alt" in FIG. 2; and current latitude/longitude position as shown by the symbols "lat" and "lon" in FIG. 2.

In addition, the display also preferably displays instruction information (not shown) to the user for instructing the user to steer right, steer left, increase velocity, decrease velocity, etc. in order to minimize a distance between a predicted destination position and a target position. Display of the instruction information can be designated to a predetermined portion of display 20 or can be in a location which is varied so as not to impede the user's view of the other displayed information indicated above.

FIG. 2 also depicts a key pad 10 of the position guidance apparatus 100. The key pad 10 preferably includes 4 keys, for example, including a JUMP key 12; an ORIENT key 14; a LIGHT key 16; and a DOWN key 18. Operation of the keys will be described in more detail with regard to FIG. 6 of the present application, but briefly the functions are as follows:

The ORIENT button 14 is the first button pressed before a jump starts. The JUMP button 12 is depressed just before the parachute jumper jumps from an air platform and begins his descent. This button activates the calculation and display of the predicted destination position versus the target position or desired drop zone, based on calculations from a global positioning system (GPS) receiver, magnetic north, and inputs from an electronic compass and a digital altimeter. The DOWN button 18 is depressed after the jump is complete and terminates the jump phase of operations, stopping the calculation and display of the predicted destination position and maintaining other displayed information. Finally, the LIGHT button 16 activates/deactivates the lighting of the display 20.

FIG. 3 illustrates the components of the position guidance apparatus 100 of the first embodiment of the present application. The position guidance apparatus 100 includes a GPS receiver 200, which in turn includes a GPS antenna 95 and a GPS computer processing unit (CPU) 90. The GPS antenna 95 can alternatively be in the form of unit separate from the position guidance apparatus 100, and can be mounted on a different location of the user, such as in a backpack of the user as will be described in later embodiments of the present application. The GPS CPU 90 includes appropriate position calculating information necessary for obtaining a GPS longitude/latitude fix, and for updating longitude/latitude information as the user begins descent of the jump. Alternatively, the GPS CPU 90 can be integrated into the CPU 30, which is the main CPU of the position guidance apparatus itself.

As shown in FIG. 3, the position guidance apparatus 100 further includes a centrally located CPU 30 which receives GPS signals form GPS receiver 200. The CPU 30 is further connected to an electronic compass 80 and digital altimeter 70 to receive directional and altitude signals therefrom. It should be noted that similar to the GPS antenna 95, the position guidance apparatus 100 can include an integral electronic compass 80 and digital altimeter 70, or can alternatively include a separate electronic compass 80 and/or digital altimeter 70 which are separately located on another part of the user, such as in the backpack for example. The CPU 30 acts as a device for receiving positioning signals including longitude, latitude and altitude from the GPS receiver 200, electronic compass 80 and digital altimeter 70. These signals are preferably continually updated each time a predetermined time interval (of one (1) second for example) expires so that the CPU 30 constantly receives updated positioning signals as the parachute jumper is descending at a rate of once per second.

Further connected to CPU 30 is a memory 40, a plug-in memory 50, a key pad 10, and a display 20. All memory storage operations can alternatively take place in memory 40, which can include a random access memory portion and a programmable read only memory portion, for example, or several memory and storage operations can take place in both memory 40 and in digital plug-in memory 50. The plug-in memory 50 can alternatively be an on-board non-volatile memory that can be programmed externally. The plug-in memory 50 can be used to store down-loaded information if security is a concern, for example. Additionally, if the user does not wish to transport the entire position guidance apparatus 100 over to the airplane or other computer for downloading of information, the detachable plug-in memory 50 can be moved independent of the entire position guidance apparatus 100.

The acquisition of GPS signals and other input position information signals allows the CPU 30 to compute and recompute longitude, latitude and altitude information as displayed on display 20 as shown in FIG. 2. Receipt of the aforementioned data allows the CPU 30 to compute current position information, target information, and predicted destination position information, based on prestored target position information, the aforementioned input received input position information, and prestored jump profile information. The electronic compass 80 is used to provide a continuous orientation value to the position guidance apparatus so that the map display can be constantly reoriented to always to be aligned to magnetic north, no matter how the arm of the parachute jumper flaps about.

Figure 4:
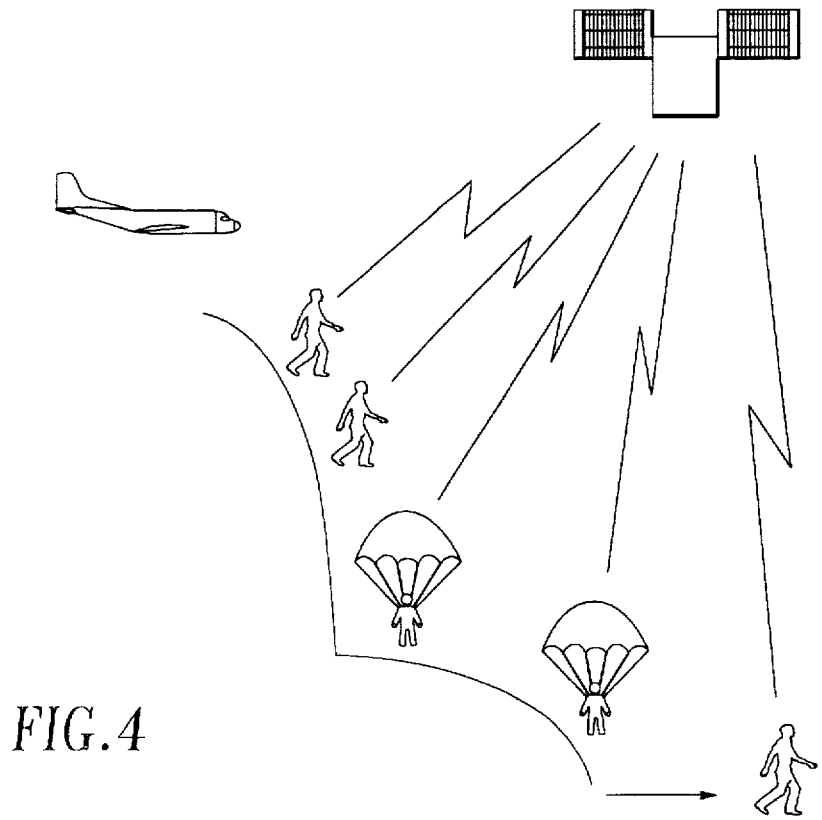
FIG. 4 illustrates a jump profile of a parachute jumper utilizing the position guidance apparatus of the first embodiment of the present application.

FIG. 4 illustrates a fall curve of a parachute jumper jumping from a plane and eventually landing on the ground. FIG. 4 further illustrates a GPS satellite maintaining communication with the parachute jumper throughout descent of the jump, so that constant information regarding current position, target position, and predicted destination position can be calculated. Operation of the position guidance apparatus is as follows.

Before a parachute jump begins a mission or parachute jump, a jump profile, flight profile and target position information are determined along with input area maps, based upon predetermined information regarding a type of parasail or parachute to be used, input designated drop zone or target position information, etc. The jump profile, flight profile, and target position information are created on a support type computer separate from the position guidance apparatus 100, such as a main computer back at a military base, or alternately on an airplane from which a parachute jumper jumps, for example. The area map data can consist of a very simple set of vector line graphics depicting roads, major rivers, and other vitally important terrain data located proximate to the predetermined target position, for example. The jump profile, area maps, flight profile, and the designated target position information are then downloaded into the position guidance apparatus 100 (preferably at the military base before a mission starts).

Figure 5:
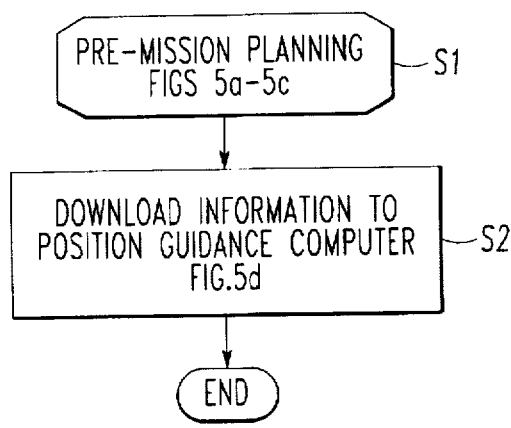
FIG. 5 is an overall flow chart illustrating the pre-mission activity which takes place prior to a jump in a mission planning computer which are further outlined in FIGS. 5a–d.
Figure 5D:
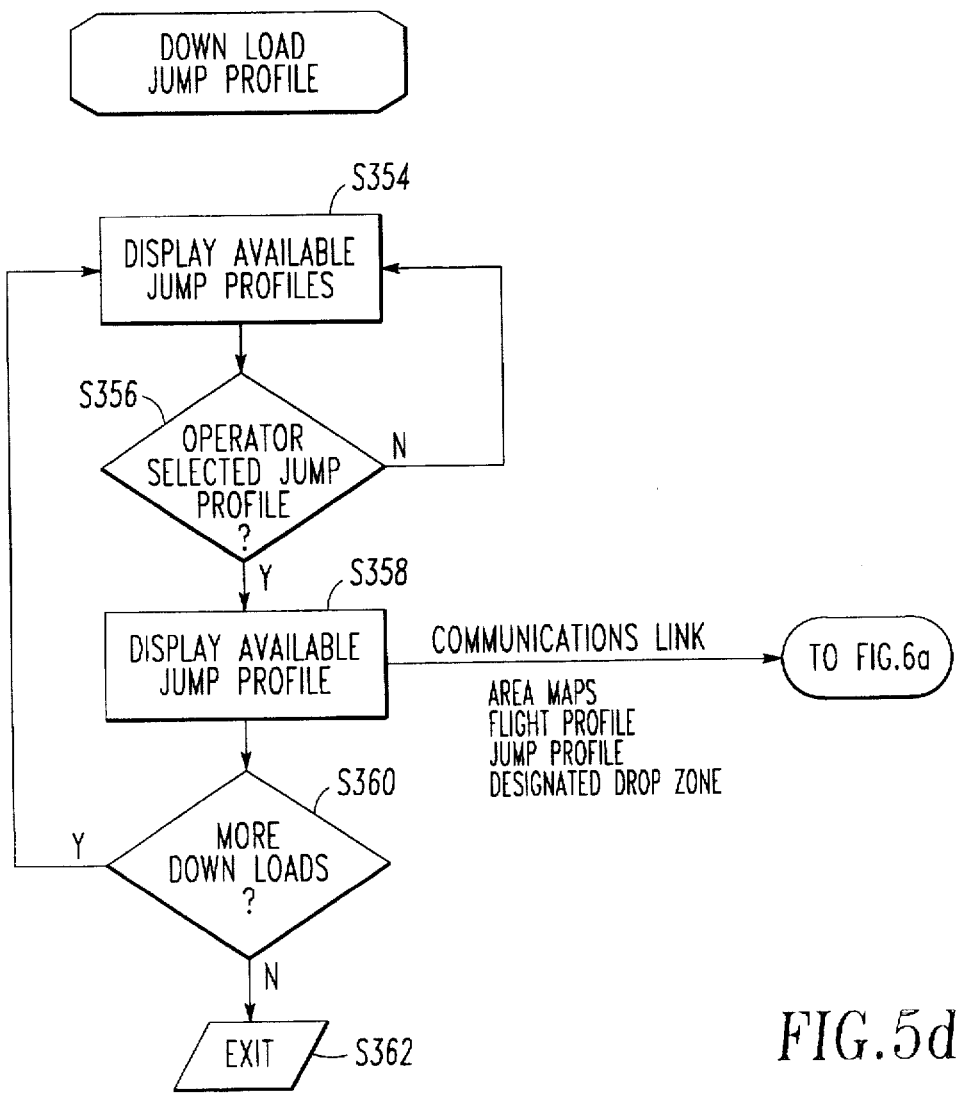
FIG. 5d is a flow chart illustrating the downloading of information from a mission planning computer to the position guidance apparatus of the first embodiment of the present application.

FIG. 5 is a flow chart illustrating the premission planning steps which take place before a parachute jump actually begins. The pre-mission planning information is gathered in step S1 of FIG. 5 (the details of which are depicted in flow charts of FIGS. 5a–c and will be described hereafter). Thereafter, the jump profile, flight profile, area maps and target position information are downloaded to the position guidance apparatus 100 in step S2 (the details of which are depicted in FIG. 5d which will also be explained hereafter). Thereafter, the premission planning operations of the on-base computer are ended.

Figure 6:
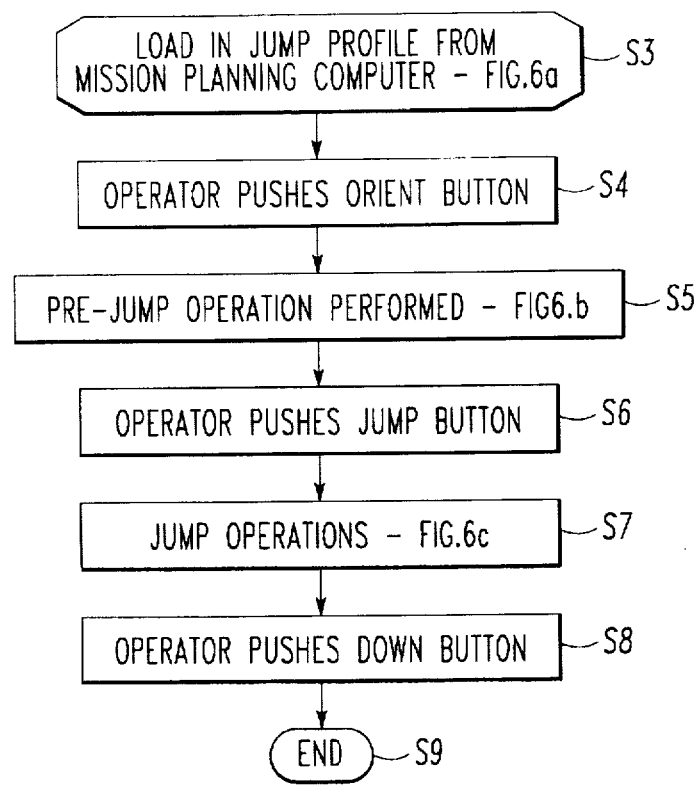
FIG. 6 is a flow chart illustrating the overall operation which takes place in the position guidance apparatus of the first embodiment of the present application, some of the steps of which are further detailed in FIG. 6a–c.

FIG. 6 illustrates both the pre-mission operations and other operations which take place during the mission.

regarding the position guidance apparatus 100. Initially, in step S3, the unit is turned on as the jump point is approached and the jump profile information, flight profile information, area maps, and designated target position information are downloaded from internal memory storage in the plane to the position guidance apparatus 100 and are stored in memory therein. When on final approach to the jump point, the user then plugs the position guidance apparatus 100 into an antenna lead connected to an external GPS compatible antenna located on the airplane. The ORIENT button 14 is then depressed and a GPS latitude/longitude fix is obtained in step S4. Pre-jump phase operations are then performed in step S5, the details of which are shown in FIG. 6b and will be described hereafter. A jump warning is then indicated (displayed and/or audibly indicated) to the user and the JUMP button 12 is thereafter depressed in step S6 after the user disconnects from the external GPS compatible antenna. The user thereafter exits the air platform of the plane. Various jump operations thereafter occur in step S7, the details in which are shown in FIG. 6c and will be described hereafter, wherein target position, current position, and predicted destination position of the parachute jumper are determined and displayed to a user during his descent. The user is then able to change his fall profile as required to land in the target position throughout the free-fall and parachute parts of the jump based upon instruction information received from a display on a display 20 of the position guidance apparatus 100. Thereafter, upon landing, the user pushes the DOWN button 18 in step S8, stopping calculations and display of the predetermined destination position, and maintaining other displayed information. Operations end in step S9. The position guidance apparatus 100 can thereafter be used as a compass and GPS unit combined with terrain map display for use in completing a ground phase portion of a mission. Thus, at the end of operation in step S9, although the jump phase calculations have been stopped upon the operator pushing the DOWN button in step S8, the position guidance apparatus continues map display of terrain, current position, and target position for the use of continuing the ground phase of the mission.

Figure 5A:
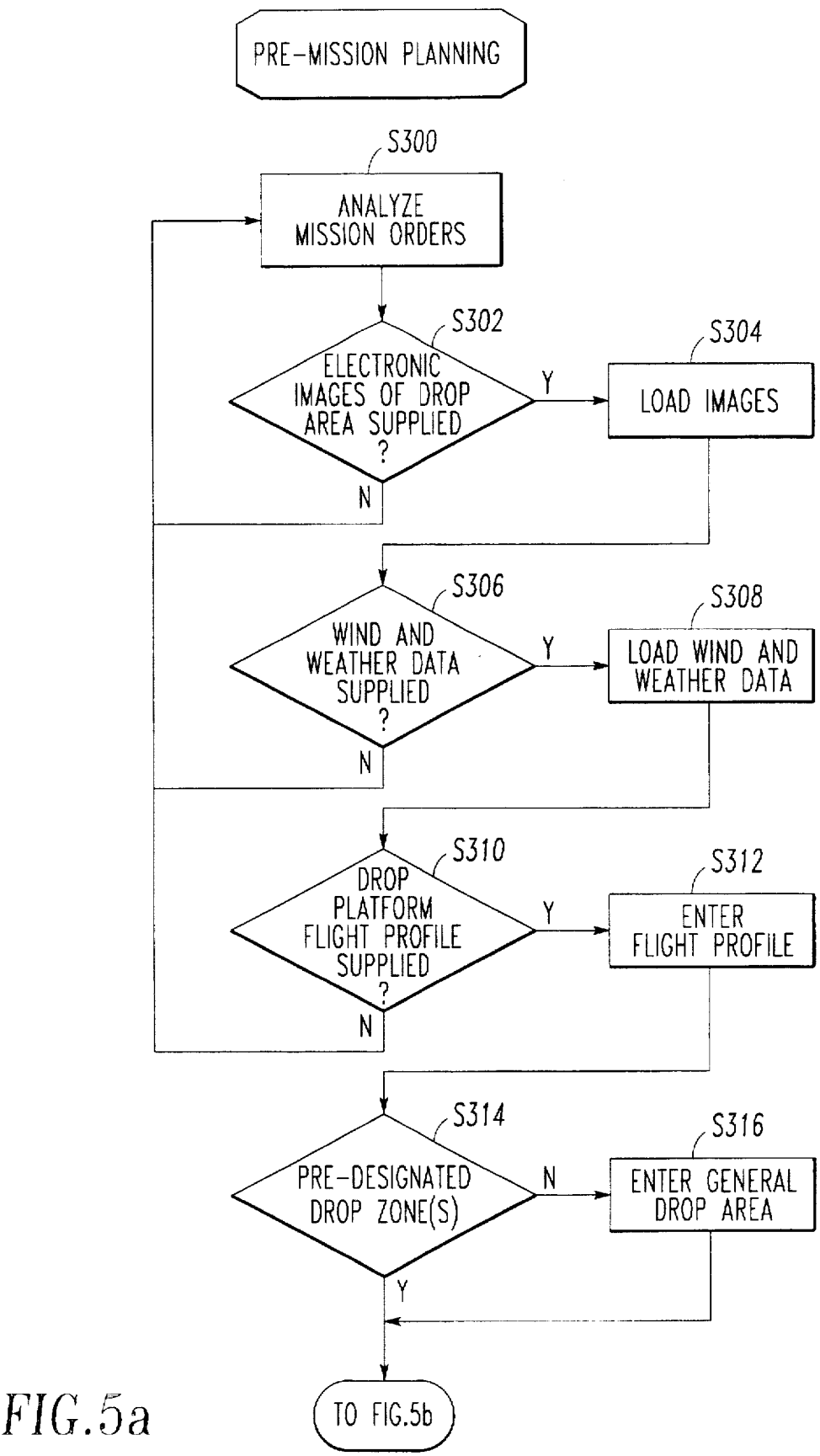
FIGS. 5a–c are flow charts illustrating the details of the pre-mission planning operation.
Figure 5B:
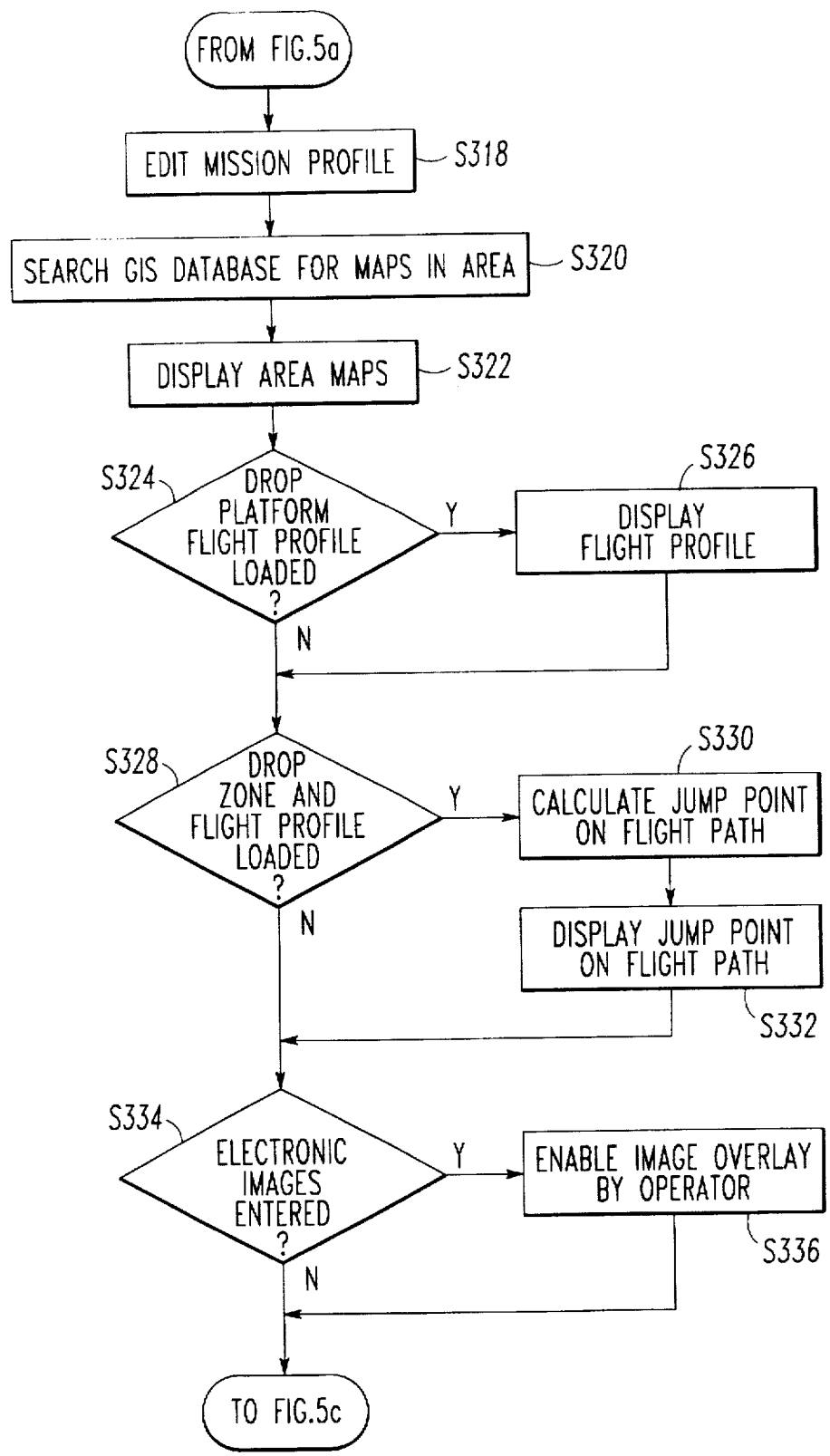
Figure 5C:
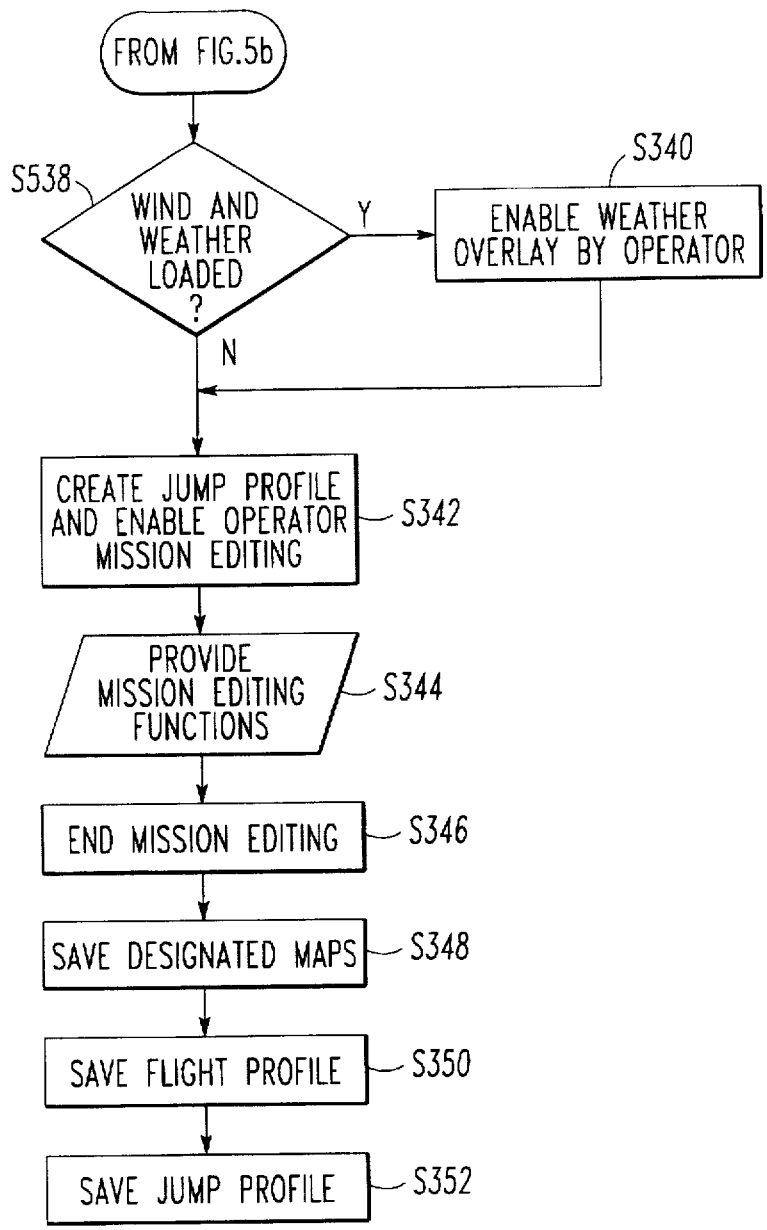

The pre-mission planning phase, wherein information is loaded into the on-base computer, is depicted in flow chart form in FIGS. 5a–c. Initially, mission orders including predetermined target position (drop-zone) information, information concerning a target position or drop-zone area (a predetermined area surrounding the target position) etc. are analyzed and input in step S300. Thereafter, it is determined whether or not electronic images of terrain surrounding the drop area or predetermined target position have been supplied. If so, then images of the target position, including images of terrain, rivers, etc. surrounding the predetermined target position are loaded in step S304. If not, the system returns to step S300. Thereafter, in step S306, it is determined whether or not wind and weather data regarding the target position area have been supplied and whether or not information regarding the type of parachute or parasail being used have been supplied. If so, wind and weather data are loaded in step S308. If not, the system returns to step S300.

Once the electronic images and wind and weather data have been supplied and loaded, the system then determines whether or not a flight profile has been supplied in step S310. If so, then in step S312, a flight profile is entered. If not, the system returns to step S300. Thereafter, in step S314, it is determined whether or not a pre-designated drop zone(s) or predetermined target position information has been entered. If not, then such information is then entered in step S316 and the system moves to FIG. 5b.

In FIG. 5b, the system proceeds to step S318 wherein the mission profile is edited, if necessary. Thereafter, in step S320, the GIS (Geographic Information System) data base is searched for maps of the target area. In step S322, maps of the target area are then displayed. The system then proceeds to step S324 wherein it is determined whether or not the flight profile has been loaded. The flight profile includes a connecting series of way points to which a plane will fly, at what speed, and at what altitude. If so, then this flight profile is displayed in S326. The system then proceeds to step S328, wherein it is determined whether or not the drop zone or target position and the flight profile have been loaded. If so, then the system calculates the jump point (the starting point for beginning the descent or jump toward the target position) in step S330 which indicates the location at which the parachute jumper should begin his jump. This jump point is then displayed along the flight path of the plane in step S332.

Thereafter, the system proceeds to step S334 where it is determined whether or not electronic images have been entered. If so, then in step S336 an image overlay is enabled and viewed by the operator. Thereafter, the system proceeds to FIG. 5c.

In step S338, it is determined whether or not wind or weather data have been loaded. If so, then a weather overlay is enabled and viewed by the operator in step S340. Thereafter, in step S342, a jump profile is created using the loaded information and editing of the jump profile of the mission is enabled and mission editing functions are thereafter provided in step S344. After mission editing is completed in step S346, the following information regarding the mission is saved. The predetermined target position and drop-zone area are saved and, in step S348, designated maps including terrain, rivers, etc. surrounding the target position are saved. In step S350 the flight profile is saved so that the reaching of a precise jump point can be determined; and in step S352, the jump profile of information to be used during the actual jump itself including target position information, map data of the area surrounding the target positions including roads, major rivers, terrain information, and jump profile information regarding the fall/glide curve of the type of parachute to be used for example, is saved. Parachutes have a known glide ratio ("m") that is part of their manufactured specification. This effectively ends the pre-mission planning stage which occurs utilizing the on-base computer, as set forth in step S1 of FIG. 5. The system then moves to step S2 of FIG. 5 wherein jump profile, flight profile, area maps, designated or target position and drop-zone area and other information is downloaded to the position guidance apparatus 100, as will be discussed hereafter with regard to FIG. 5d.

Initially, the downloading of the aforementioned information begins in step S354, where available jump profiles are displayed. In step S356, it determines whether or not the operator has selected a particular jump profile, flight profile, etc. If so, then the jump profile and other information is downloaded from the on-base computer to the position guidance apparatus 100 and is stored in memory therein. Along with the selected jump profile, area maps of the areas surrounding the target position are downloaded, a selected flight profile is downloaded, and the target position, desired jump point (longitude and latitude), parachute type, and drop-zone area information are downloaded to the computer of the position guidance apparatus 100 for storage therein. Finally, in step S360, it is determined whether or not more downloads to other position guidance apparatuses 100 are necessary, and if not, then operation is complete in step S362.

Figure 6A:
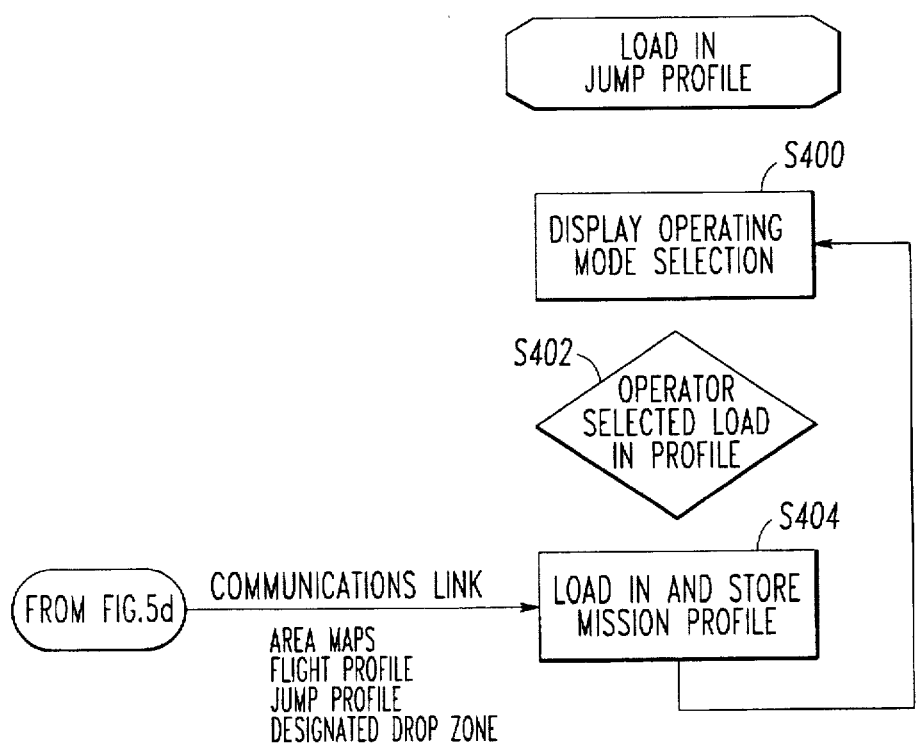
FIG. 6a is a flow chart illustrating the details of loading a jump profile and other pre-jump information from the mission planning computer to the position guidance apparatus of the first embodiment of the present application.
Figure 6C:
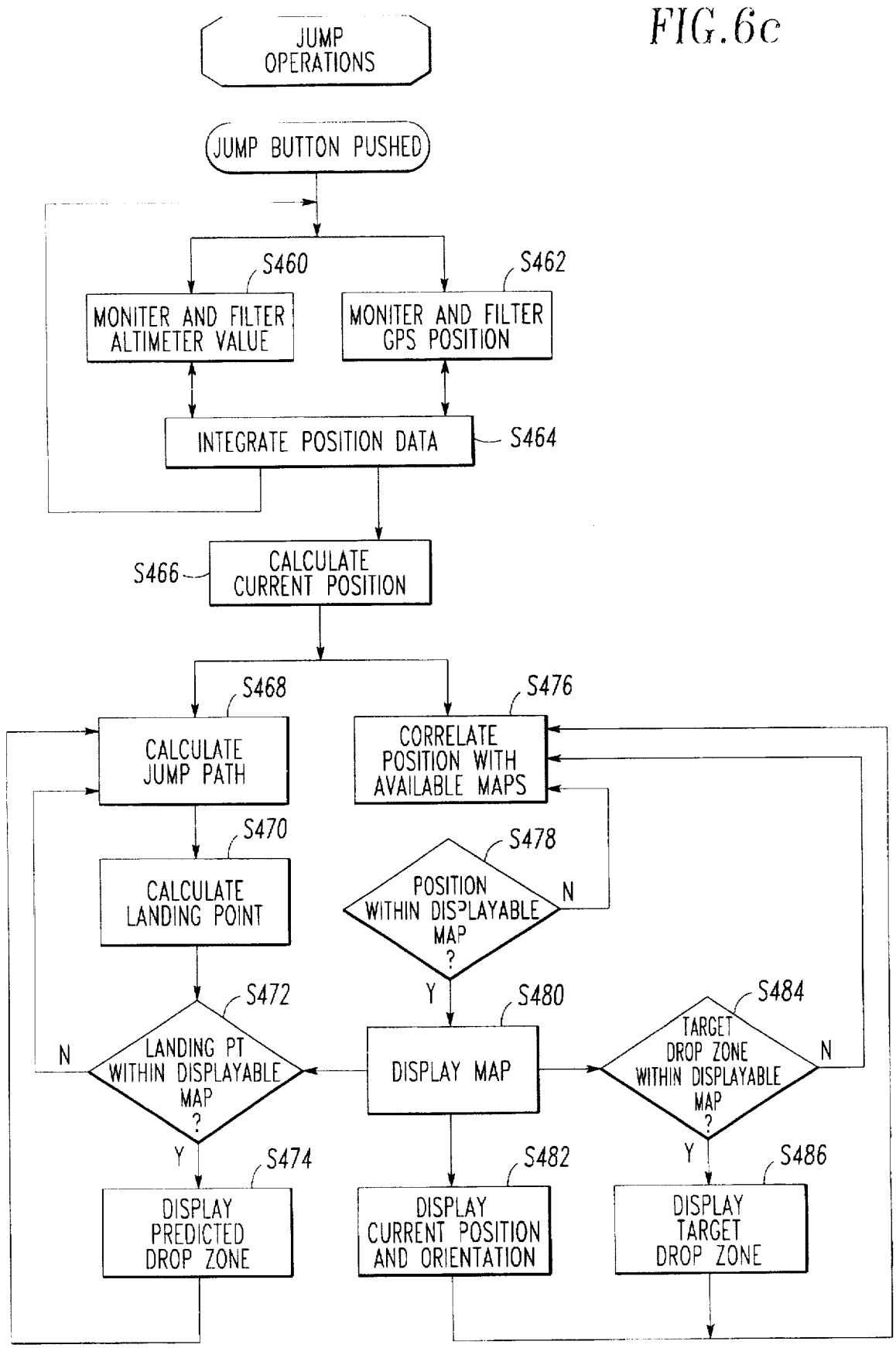
FIG. 6c is a flow chart illustrating the operations of the position guidance apparatus of the first embodiment of the present application incurred during a parachute jump.

FIG. 6a illustrates the procedure of downloading information from the main computer on the airplane to the position guidance apparatus 100 to thereby prestore certain mission profile information within the position guidance apparatus 100. In step S400, operating modes selection is displayed to a user. Thereafter, in step S402, it is determined whether or not an operator has selected appropriate mission profile information. If so, then in step S404, the selected mission profile information, including area maps, selected flight profile, selected jump profile and the selected target position and drop zone area are loaded into memory of the position guidance apparatus 100. Thus, the downloading operation is complete.

Initially, upon the system being turned on, the system BIT (Built-In Test) is performed in step S406. The position guidance apparatus 100 is then plugged into an antenna lead connected to an external GPS antenna and the ORIENT button is pressed in step S407 before main pre-jump calculations of FIG. 6b begin, to obtain GPS longitude/latitude fix. Then, the mission profile information is loaded in step S408. The system then officially moves to the pre-jump phase of performing pre-jump calculations based on input information received prior to the parachute jump occurring, as described after step S468 in FIG. 6b of the present application. The mission profile information includes the aforementioned area maps, flight profile, jump profile, and target position and drop zone information.

Thereafter, in step S410, the system monitors for an altimeter pressure drop. In step S412, it is determined whether or not the altitude has been altered. If so, then in step S414, the altimeter value is monitored and filtered and is thereafter output to step S430 and integrated into the position data.

Further, after loading in the mission profile information in step S408, the system also monitors for a GPS signal in step S416. In step S418, it is determined whether or not a GPS signal has been acquired. If so, in step S420, the GPS position is monitored and filtered and is output to step S430 and is integrated into the position data.

Finally, also after loading in the mission profile in step S408, the system monitors for platform position feed in step S422. The airplane can have a much better navigation system that can send messages to the position guidance apparatus 100, including position and altitude data. This may be needed because the GPS signal will probably be blocked inside the plane.

Thereafter, in step S424, it is determined whether or not position feed has been started. If not, then the operator is prompted for position feed in step S426 and the system returns to step S422. If the position feed has been started in step S424, then the platform position is monitored and filtered in step S428, and thereafter output in step S430 and integrated into the position data.

After the aforementioned information has been integrated into the position data in step S430, the aforementioned information including altimeter value, GPS position, and platform position information obtained in respective steps S414, S420, and S428, the integrated position data is fed back into the system and the aforementioned steps are occurring subsequent to step S408 are repeated. Further, the integrated position data from step S430 is simultaneously sent to step S432 and is used to calculate current position of the user, who is still travelling in the plane at this time.

After current position has been calculated in step S432, a jump path is calculated in step S434. Calculation of the jump path, which utilizes the prestored glide ratio of the parasail itself (obtained from the jump profile information), will be further explained with regard to FIG. 7 of the present application. Thereafter, the landing point or target position and target position or drop zone area are calculated in step S436. In step S438, it is determined whether or not the target position is within the displayable area of the map, based upon the area map information previously loaded in step S408. If not, the system returns to step S434 and the jump path is again calculated. If so, the target position is displayed in step S440. The target position is displayed as a drop zone, surrounding the target position itself, and is displayed preferably as a rectangle 28 as shown in FIG. 2 of the present application. Thereafter, the system returns to step S434, and recalculates the jump path based upon newly received updated current position information.

Further, subsequent to calculating the current position in step S432, the system correlates the calculated current position with available maps in step S442. In step S444, it is determined whether or not the calculated current position is within the prestored available maps. If not, then the system returns to step S442, and if so, the system moves to step S446 wherein an area map of the terrain surrounding the target area is displayed on display 20. Thereafter, in step S448, the current position of the user and orientation (direction) are displayed in step S448 as an arrow 24 on display 20 in FIG. 2. Thereafter, the system returns to step S442.

Further, after the map is displayed in step S446, the system also determines whether or not the predicted drop zone area is within the displayable map in step S450. If so, then the predicted drop zone is displayed in step S452, preferably as an ellipse 29 as shown in FIG. 2 of the present application. Thereafter, the system returns to step S442.

Finally, after calculating the current position in step S432, the system also begin calculating a jump warning in step S454. In step S456, it is determined whether or not a jump warning point has been reached, namely a point wherein the plane itself is close to the precalculated jump point. If not, the system returns to step S454. If so, however, a jump warning is issued to the operator in step S458 via display 20 (and/or audibly). At this point, the user will disconnect the position guidance apparatus from the external antenna of the plane; will push the jump button 12 as in step S6 of FIG. 6 for example; and will exit the air platform. At this time, the position guidance apparatus 100 operates as shown in FIG. 6c.

During the actual parachute jump, the position guidance apparatus 100 continually receives signals from the GPS receiver 200, the electronic compass 80, and the digital altimeter 70. The received altimeter value is monitored and filtered in step S460, and the received GPS position signals are received in step S462. Position data from step S460 and S462 are then integrated in step S464. Thus, during the jump itself, the position guidance apparatus 100 receives longitude, latitude and altitude input position information. The system then feeds back to await receipt of new input information. It should be noted that input information is received and current position is updated on a continuous basis, after a predetermined time interval (one second) has passed for example. It should be noted that the GPS position signals will update at an interval set by the manufacturer (one (1) second or less) and the position guidance apparatus 100 will update position calculations/display once per second. Accordingly, after each predetermined time interval, current position is thereafter calculated or recalculated in step S466 based upon the integrated position data of step S464.

Utilizing the calculated current position information of step S466 and prestored information including jump profile information, a jump path is then calculated in step S468. Thereafter, a predicted destination position or landing point is calculated in step S470. This predicted destination position includes a predicted drop zone area, similar to the target area surrounding the predetermined target position, which is of a predetermined radius surrounding the predicted destination position. In step S472, it is then determined whether or not the predicted destination position is within displayable map. If not, the system returns to step S468. If so, the predicted destination position is displayed as a predicted drop zone area in step S474, as an ellipse 29 on the display 20. Thereafter, the system returns to step S468.

In addition, after the current position has been calculated in step S466, this current position information is correlated with available maps in step S476. It is then determined whether or not the calculated current position is within a displayable map in step S478. If not, the system returns to step S476. If so, then the map is displayed in step S480. Thereafter, the current position and orientation of the parachute jumper are then displayed in step S482 as an arrow 24 on display 20, for example. Thereafter, the system returns to step S476.

In addition, after the map is displayed in step S480, it is determined whether or not the target position drop zone is within the displayable map in step S484. If not, the system returns to step S476. If so, then the target position or target drop zone area is then displayed in step S486 as rectangle 28 of display 20. Thereafter, the system returns to step S476. The detailed calculation of the jump path based upon the glide ratio of the parasail or parachute itself, the target position, the current position, and the predicted landing point or destination position, will be explained in more detail hereafter.

FIG. 7 illustrates the necessary information used in calculating the jump path and predicted destination information. The calculation of the jump path includes calculation of the time Ta that it takes for a parachute jumper to reach the ground, also factoring in a predetermined and prestored glide ratio "m" of a particular parasail or parachute to be used. Utilizing Z=0, namely the point at which the altitude is zero and the parachute jumper will land, the equation $Z=-mTa+A_o$, is solved, wherein Ta is the time it takes for the parachute jumper to reach the ground and $A_o$ is the current altitude of the jumper.

For any current altitude information $A_o$, input from the altimeter 70, the particular time to reach the ground Ta is then calculated as follows:

$$Ta=A_o/m$$

Thereafter, using current position information $x_o$, $y_o$, and the calculated time Ta (calculated using the prestored constant m), a predicted destination position $x_p$, $y_p$, namely the predicted destination of the parachute jumper, can be calculated as follows:

$$x_p=-mTa+x_o;$$

$$y_p=-mTa+y_o.$$

FIG. 8 depicts a current position $x_o$, $y_o$ a calculated predicted destination position $x_p$, $y_p$ a target landing position $X_L$, $Y_L$ and difference between the predicted destination position $x_p$, $y_p$ and the target landing position $X_L$, $Y_L$. The calculation of the aforementioned distance d and the calculation of a difference between a velocity ($v_L$) required to reach a target position ($X_L$, $Y_L$) and the velocity ($v_P$) involving the predicted destination position ($x_p$, $y_p$) are as follows.

Utilizing the aforementioned calculated or known values, the distance d between the target position $X_L$, $Y_L$ and the predicted destination position $x_p$, $y_p$, is determined as follows:

$$d = \sqrt{(x_L - x_p)^2 + (y_L - y_p)^2}$$

The predicted destination position velocity VL required to reach the target position $y_L$, $X_L$, is determined by the following two equations:

$$VxL=(X_L-x_o)/Ta;$$

$$VyL=(Y_L-y_o)/Ta.$$

Thereafter, the velocity for traveling to predicted destination position xp, yp is calculated as follows:

$$Vxp=(x_p-x_o)/Ta$$

$$Vyp=(y_p-y_o)/Ta.$$

A differential velocity (Vd) can then be calculated, from the velocity ($v_p$) for traveling to the predicted destination position $x_p$, $x_p$ and the velocity ($v_L$) required to travel to the target position $x_L$, $y_L$, as follows:

$$vd = \sqrt{(VxL - Vxp)^2 - (VyL - Vyp)^2}$$

Accordingly, current position $x_o$, $y_o$ and current altitude $a_o$, can be determined in step S466 from the longitude and latitude position signals received from the GPS receiver in step S462 and from altitude position signals received from the altimeter in step S460. Thereafter, the jump path information, including the time until the parachute jumper will reach the ground ta is calculated in step S468. The predicted destination position $x_p$, $y_p$ can then be calculated in step S470, wherein each of the current position, target position, and predicted destination positions can be displayed in steps S474, S482 and S486.

Further, utilizing the aforementioned computed differential velocity (Vd) and difference (d) between the predicted destination position and target position, correction information can be determined so that instruction information for correcting the aforementioned difference between the target position and predicted destination position, can be determined and displayed. This will be described with regard to FIGS. 9a–c for example.

Figure 9A:
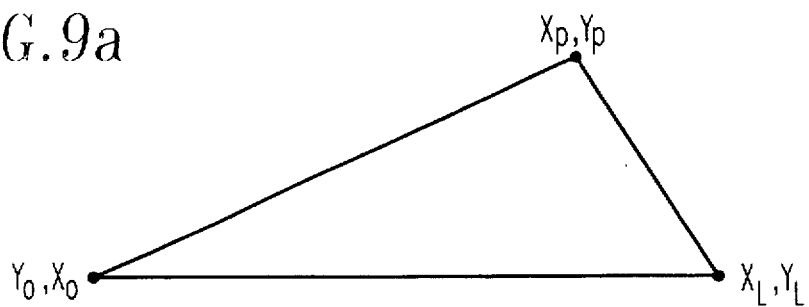
FIG. 9 is a graph used for computing directional and velocity difference information between current heading information and desired heading information.
FIG. 9b is a graph illustrating velocity and position difference vectors.
FIG. 9c is a flow chart illustrating the aspect of providing interactive position guidance information for instructing the user to steer right or left to minimize the difference between a predetermined target position and a predicted destination position.
Figure 9B:
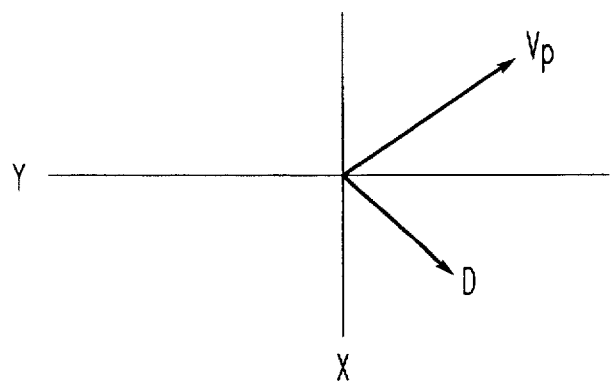
Figure 9C:
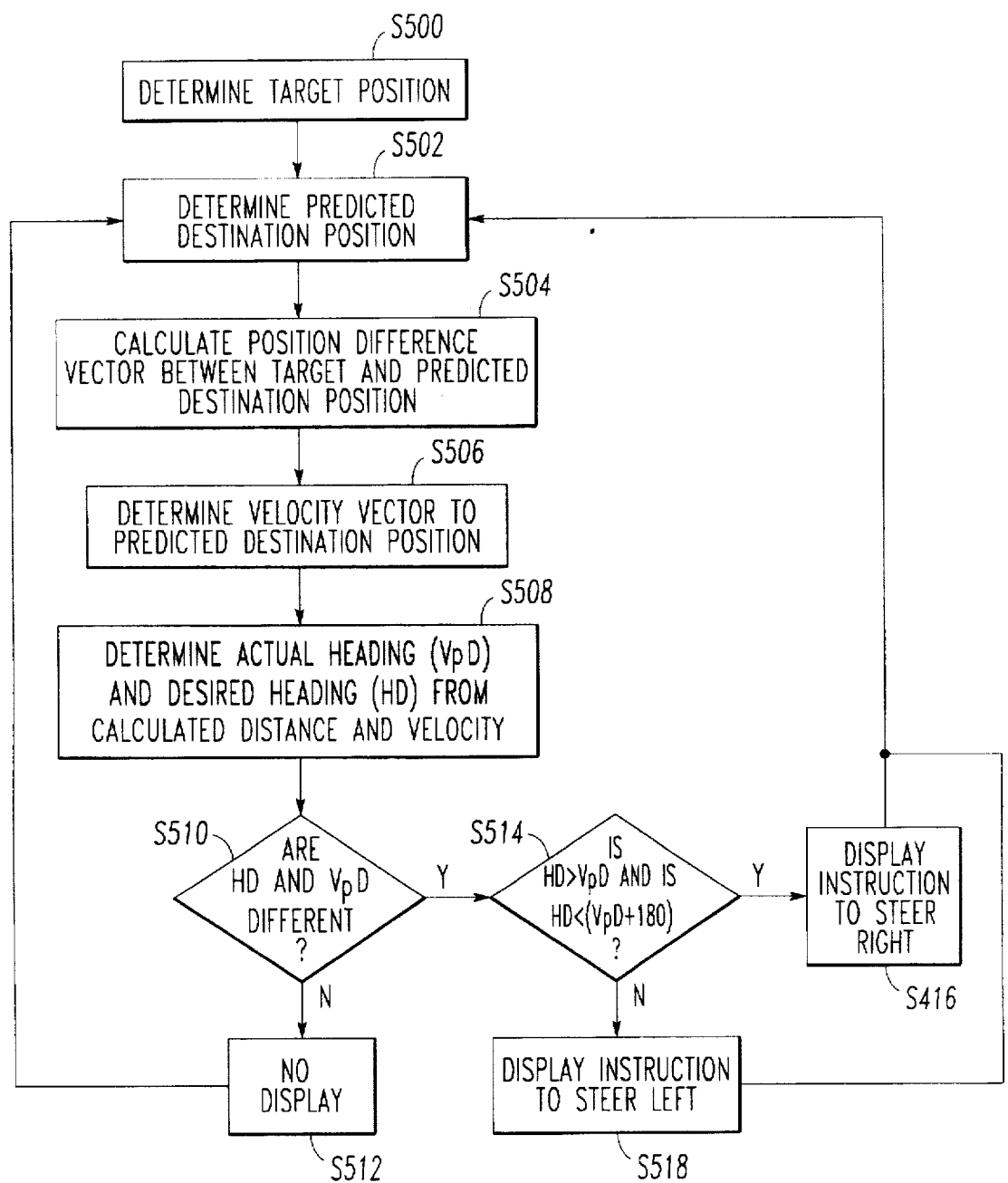

Initially, in step S500 of FIG. 9c, the target position $x_L$, $y_L$ is determined based upon prestored information. Thereafter, in step S502, the predicted destination position $x_p$, $y_p$ is determined based upon the aforementioned calculations. FIG. 9a illustrates the current position $x_o$, $y_o$, the target position $x_L$, $y_L$ and the predicted destination position $x_p$, $y_p$.

Thereafter, in step S504, a position difference vector D as shown in FIG. 9b is calculated based upon the x coordinate difference information $x_L-x_p$ and the y coordinate difference information $y_L-y_p$ between the target and predicted destination positions.

Thereafter, in step S506, representing the differential velocity vector Vp is determined based upon Vxp, Vyp and the aforementioned calculations. The differential velocity vector $v_p$ is shown in FIG. 9b.

Finally, from the calculated position difference vector D and determined velocity vector $v_p$, a heading of predicted velocity VpD is determined. Similarly, a desired heading HD is calculated based upon the target position $x_L$, $y_L$ and target velocity $v_L$. Note that heading involves the translation of velocity from (x,y) coordinates to polar coordinates (r,θ), where θ is the heading. For the sake of brevity, further calculations have been omitted.

In step S510, it is determined whether or not HD and VpD are different. If not, then no additional display or instruction information is displayed indicating "steer straight", is made in step S512. However, if the desired heading HD and actual heading VpD are different, then it is determined whether or not the following conditions are satisfied in step S514:

Is $HD > VpD$ and is $HD < (VpD+180)$?

If the aforementioned conditions are satisfied, then in step S516, instruction information is displayed to the parachute jumper in the form of an instruction to "steer right". This will aid the parachute jumper in minimizing the difference between the predetermined target position and predicted destination of the parachute jumper. If one or both of the aforementioned conditions are not satisfied, then step S518, instruction information instructing the parachute jumper to "steer left" is displayed to again aid the parachute jumper in minimizing the difference between the predetermined target position and the predicted destination of the parachute jumper. After display of instructions to steer to the right in step S516, instructions to steer to the left in step S518, or to steer straight or no display in step S512, the system returns to step S502 to again determine the predicted destination position.

Figure 10A:
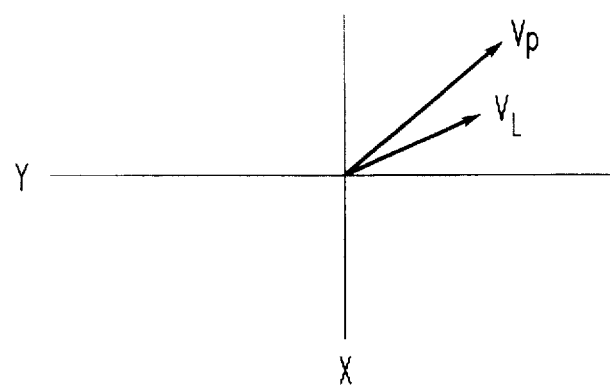
FIG. 10a is a graph illustrating velocity vectors.
Figure 10B:
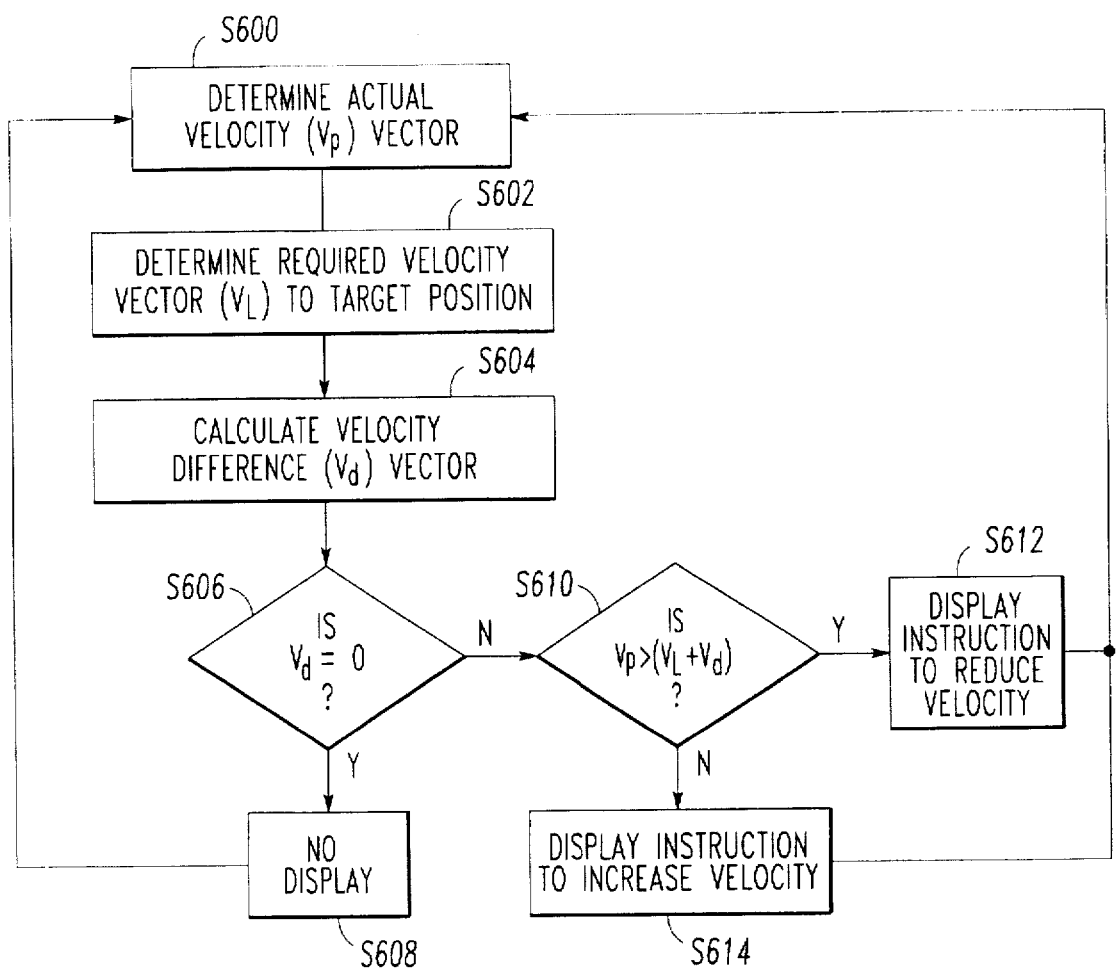
FIG. 10b is a flow chart illustrating the aspect of providing instruction information for increasing or reducing velocity to minimize the calculated difference between a predetermined target position and a predicted destination position.

FIGS. 10a and 10b are also directed to calculating and displaying instruction information to the parachute jumper to aid in minimizing the difference between the predetermined target position and the predicted destination of a parachute jumper. FIG. 10a illustrates a first vector Vp representing the actual velocity to the predicted destination position, and vector VL indicates the required velocity to reach the target position. The aforementioned vectors are calculated based upon the calculations previously discussed regarding FIG. 8. The actual velocity vector Vp is calculated in step S600 of FIG. 10b. Thereafter, the required velocity vector VL necessary to reach the target position is calculated in step S602. Then a speed difference vector Vd is determined from the actual velocity vector Vp and required velocity vector VL in step S604. Then, in step S606, it is determined whether of not Vd is equal to zero. If so, then no additional display, or a display to maintain velocity, is made in step S608, and the system returns to step S600. If Vd not equal to zero, then the system moves to step S610.

In step S610, it is determined whether or not Vp is greater than (VL+Vd). If so, then in step S612 instruction information to "reduce velocity" is displayed on display 20 to the parachute jumper, as an indication that if velocity is not reduced then the parachute jumper will likely overshoot the drop zone or target position. If Vp is less than (VL+Vd), then in step S614 instruction information is displayed to "increase velocity", on display 20, since the parachute jumper will likely undershoot the drop zone or target position if velocity is not increased. Thereafter, the system returns to step S600.

Figure 11:
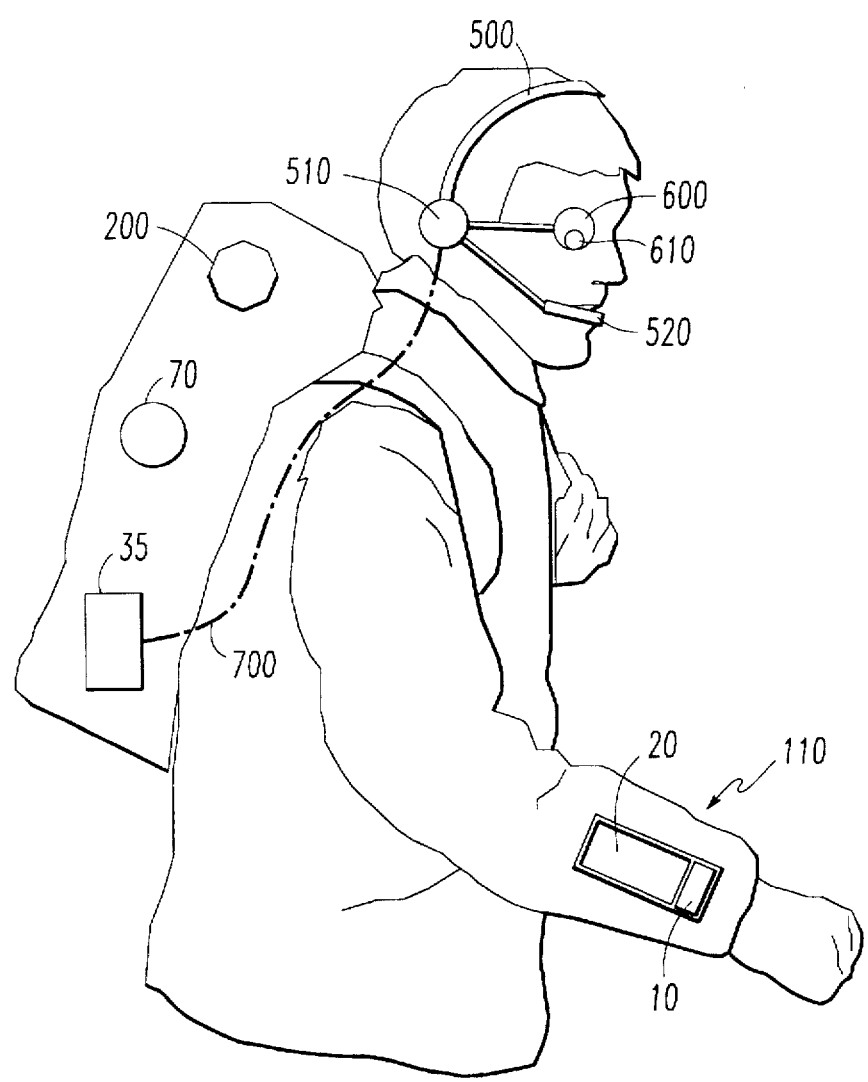
FIG. 11 illustrates an alternative embodiment of the position guidance apparatus of the present application.

FIG. 11 illustrates alternative embodiments of the present application. In one alternate embodiment, for example, the GPS receiver 200 can be a separate unit mounted on the top of a backpack of a user, for example. Similarly, the digital altimeter 70 can also be a separate device mounted on the top of the backpack as shown in FIG. 11. Further, the main computing unit 35, including all the components of FIG. 3 except the aforementioned components and display 20 and keypad 10, can also be housed in the backpack as illustrated in FIG. 11. The main computing unit 35 can then be wired to the arm display unit 110, including the display 20 and keypad 10, as well as to the digital altimeter 70 and GPS antenna 200.

In addition, FIG. 11 illustrates a headset unit 500 including an ear piece 510 and a microphone 520. This headset, wired via unit 700 to the main unit 35, or to the entire position guidance apparatus 100 as shown in FIG. 3 for example, can then be used to output voice and/or tone command signals similar to the aforementioned instruction information for varying velocity or direction to correct any difference between the target position and the predicted destination position. Thus, the display 20 can display instruction information for steering to the left or steering to the right or steering straight, and the headset could provide audible information to the user through ear piece 510 regarding similar commands of "steer left", "steer right", "steer straight". Similarly, while the display 20 can display instruction information regarding instructions to increase or decrease velocity or to glide long or glide short, audible information can be provided to the user via ear piece 510 indicating "glide long", "glide short", "spiral to the right or left", etc.

Finally, FIG. 11 further illustrates alternative displays for displaying information to the parachute jumper. One such display includes a head mounted display 600 which can be in the form of a half-silvered monocle or glasses, including a tiny LCD screen 610. Preferably, the main display of information would be maintained on the arm display unit 110 in display area 20 and only essential elements needed for the jump would be displayed in display area 610 including position and orientation of the parachute jumper, major landmarks, and altitude, for example. An alternative additional display can be a virtual retinal display including a laser that is scanned directly into the eye of the wearer providing a floating display. Such a display would again display only the essential data elements needed for the jump.

FIGS. 12a and 12b illustrate various alternative configurations of the components of the position guidance system of the present application. FIG. 12a illustrates a main computing unit 35 which is stored in a backpack for example, connected to an arm display unit 110, a separate digital altimeter 70, GPS antenna 200 and a GPS receiving unit 90. FIG. 12a further illustrates the headset 500 and the head mounted display 600, also connected to the main computing unit 35.

FIG. 12b illustrates another embodiment of the components of the position guidance system of the present application, including a main computing unit 35 housable in a backpack, connected to a separate GPS antenna 200, digital altimeter 70, an arm display unit 110. Headset 500 and head mounted display 600 are also illustrated, and are connectable to the main computing unit 35.

Alternative uses for the position guidance system of the present application include interfacing the apparatus to new and existing "smart" tools including a team radio, digital camera, pop-up floating GPS antenna, laser range-finder/compass, and/or sonar navigation system. Existing military communication software added to the position guidance system of the present application could provide for message formatting and automated messaging on standard military radios and networks via known interfaces for example. If satellite links are being used, the position guidance system of the present application could provide notification to the operator when the next transmit/receive window is available, for example.

Utilizing a laser range-finder/compass, information to locate an enemy person or asset could be detected. Initially, the position guidance system would store GPS position information, the combatant would zap the enemy asset with the laser range-finder/compass, data could be stored until off-loaded to the position guidance apparatus 100 and data could be combined with the GPS data to exactly locate the enemy asset. Use of infrared communicational links between the position guidance system and other systems could further reduce the amount of wiring needed to provide appropriate communication links.

Finally, regarding sonar information, the position guidance system of the present application could utilize a pop-up GPS antenna along with an underwater compass to guide an underwater diver in a manner somewhat similar to the aforementioned guidance of the parachute jumper described previously regarding the position guidance apparatus 100.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

What is claimed is:

1. A position guidance apparatus comprising:
   first means for prestoring position information;
   second means for receiving input position information;
   third means for determining a target position based upon the prestored position information, for determining current position based upon the received input position information, and for determining a predicted destination position based upon the received input position information and prestored position information; and
   display means for displaying the target position, the current position and the predicted destination position to a user to thereby enable the user to thereafter minimize any target and predicted destination position difference.

2. The position guidance apparatus of claim 1, wherein the apparatus is relatively small so as to be mountable on as appendage of the user.

3. The position guidance apparatus of claim 1, wherein the display means displays the target position as a first geometric shape and displays the predicted destination position as a second geometric shape, different from the first geometric shape.

4. The position guidance apparatus of claim 1, wherein the current position is displayed as an arrow.

5. The position guidance apparatus of claim 4, wherein a direction of the arrow indicates directional information.

6. The position guidance apparatus of claim 1, wherein the second means receives longitude, latitude, and altitude input position information.

7. The position guidance apparatus of claim 6, wherein the third means determines the predicted destination position based upon received input longitude, latitude and altitude position information.

8. The position guidance apparatus of claim 1, wherein the third means determines a target position area surrounding the target position and determines a predicted destination area surrounding the predicted destination position and the display means displays the determined target position area and predicted destination area.

9. The position guidance apparatus of claim 8, wherein the display means displays the target position area as a first geometric shape and displays the predicted destination area as a second geometric shape, different from the first geometric shape.

10. The position guidance apparatus of claim 1, wherein the first means further prestores image information of known terrain proximate to the target position and the display means displays the prestored image information.

11. The position guidance apparatus of claim 1, wherein the first means prestores jump profile information, and the third means determines the predicted destination position based on the received input position information and the prestored jump profile information.

12. A position guidance method, comprising the steps of:
    prestoring target position information and destination prediction information;
    receiving input position information;
    determining a target position based upon the prestored target position information;
    determining a current position based upon the received input position information;
    determining a predicted destination position based upon the received input position information and the prestored destination prediction information; and
    displaying the determined target position, current position, and predicted destination position to a user to thereby enable the user to thereafter minimize any target and predicted destination position difference.

13. The position guidance method of claim 12, further comprising the steps of:
    determining a starting position for beginning descent to the target position, based upon the prestored target position information and prestored fight profile information; and
    displaying a command to begin descent upon determining that the determined starting position has been reached.

14. The position guidance method of claim 12, further comprising the steps of:
    determining a difference between the determined target position and predicted destination position;
    calculating correction information for correcting the determined difference; and
    displaying instruction information for instructing the user on how to minimize the determined difference based upon the calculated correction information.

15. The position guidance method of claim 14, wherein the displayed instruction information includes an instruction for varying directional information.

16. The position guidance method of claim 14, wherein the displayed instruction information includes an instruction for varying velocity information.

17. The position guidance method of claim 15, wherein the displayed instruction information includes an instruction to steer left or right.

18. The position guidance method of claim 16, wherein the displayed instruction information includes an instruction to increase or decrease velocity.

19. The position guidance apparatus of claim 1, wherein the third means further determines a difference between the determined target position and predicted destination position and calculates correction information for correcting the determined difference, and wherein the display means further displays instruction information for instructing the user on how to minimize the determined difference based upon the calculated correction information.

20. The position guidance apparatus of claim 19, wherein the displayed instruction information includes an instruction for varying directional information.

21. The position guidance apparatus of claim 19, wherein the displayed instruction information includes an instruction for varying velocity information.

22. The position guidance apparatus of claim 20, wherein the displayed instruction information includes an instruction to steer left or right.

23. The position guidance apparatus of claim 21, wherein the displayed instruction information includes an instruction increase or decrease velocity.

24. The position guidance apparatus of claim 1, further comprising:
fourth means for determining a starting position for beginning descent to the target position, based upon prestored target information and prestored flight profile information, wherein the first means prestores the flight profile information and the display means displays a command to begin descent upon determining that the determined starting position has been reached.

25. The position guidance method of claim 12, wherein the target position is displayed as a first geometric shape and the predicted destination position is displayed as a second geometric shape, different from the first geometric shape.

26. The position guidance method of claim 12, wherein the current position is displayed as an arrow.

27. The position guidance method of claim 12, wherein the received input information includes longitude, latitude and altitude information.

28. The position guidance method of claim 27, wherein the predicted destination position is determined based upon the received input longitude, latitude and altitude information.

29. The position guidance method of claim 12, wherein the step of determining a target position includes determining a target position area surrounding the target position and the step of determining a predicted destination position includes determining a predicted destination area surrounding the predicted destination position and wherein the target position area and predicted destination area are displayed.

30. The position guidance method of claim 29, wherein the target position area is displayed as a first geometric shape and the predicted destination area is displayed as a second geometric shape, different from the first geometric shape.

31. An interactive position guidance apparatus for aiding a parachute jumper in reaching a predetermined target position comprising:
first means for prestoring target position information of the predetermined target position and for prestoring jump profile information;
second means for receiving input position information at predetermined time intervals;
third means for determining, after each predetermined time interval, the current position of the parachute jumper based upon the received input position information and for determining, after each predetermined time interval, the predicted destination of the parachute jumper based upon the received input position information and the prestored jump profile information;
display means for displaying the predetermined target position, the current position, and the predicted destination of the parachute jumper, wherein display of the current position and predicted destination of the parachute jumper is updated after each predetermined time interval; and
calculation means for calculating, after each predetermined time interval, a difference between the predetermined target position and the predicted destination of the parachute jumper, wherein the display means further displays instruction information to minimize the calculated difference between the predetermined target position and the predicted destination of the parachute jumper.

32. The interactive position guidance apparatus of claim 31, wherein the displayed instruction information includes an instruction for varying directional information.

33. The interactive position guidance apparatus of claim 31, wherein the displayed instruction information includes an instruction for varying velocity information.

34. The interactive position guidance apparatus of claim 32, wherein the displayed instruction information includes an instruction to steer left or right.

35. The interactive position guidance apparatus of claim 33, wherein the displayed instruction information includes an instruction increase or decrease velocity.

36. The interactive position guidance apparatus of claim 31, wherein the apparatus is relatively small so as to be mountable on an appendage of parachute jumper.

37. The interactive position guidance apparatus of claim 31, wherein the display means displays the target position as a first geometric shape and displays the predicted destination of the parachute jumper as a second geometric shape, different from the first geometric shape.

38. The interactive position guidance apparatus of claim 31, wherein the second means receives longitude, latitude, and altitude input position information.

39. The interactive position guidance apparatus of claim 38, wherein the third means determines the predicted destination of the parachute jumper based upon received input longitude, latitude and altitude position information.

40. The interactive position guidance apparatus of claim 31, wherein the third means determines a target position area surrounding the target position and determines a predicted destination area surrounding the predicted destination of the parachute jumper and the display means displays the determined target position area and predicted destination area.

41. The interactive position guidance apparatus of claim 40, wherein the display means displays the target position area as a first geometric shape and the predicted destination area as a second geometric shape, different from the first geometric shape.

42. The interactive position guidance apparatus of claim 31, wherein the first means further prestores image information of known terrain proximate to the target position and the display means displays the prestored image information.

43. The interactive position guidance apparatus of claim 31, further comprising:
fourth means for determining a jumping position for beginning descent to the predetermined target position based upon the prestored target information and flight profile information,
wherein the display means displays a jump command to begin descent upon determining that the determined starting position has been reached.

44. The position guidance apparatus of claim 1, wherein the input position information is updated every predetermined time interval.

45. The position guidance apparatus of claim 1, wherein the input position information includes a global positioning signal.

46. The position guidance method of claim 12, wherein the input position information is updated every predetermined time interval.

47. The interactive position guidance apparatus of claim 31, wherein the input position information includes a global positioning signal.

48. The position guidance method of claim 15, wherein the instruction information is further audibly output.

49. The position guidance method of claim 16, wherein the instruction information is further audibly output.

50. The position guidance apparatus of claim 20, wherein the instruction information is further audibly output.

51. The position guidance apparatus of claim 21, wherein the instruction information is further audibly output.

52. The interactive position guidance apparatus of claim 32, wherein the instruction information is further audibly output.

53. The interactive position guidance apparatus of claim 33, wherein the instruction information is further audibly output.

54. The position guidance apparatus of claim 7, further comprising:

fourth means for determining longitude and latitude position information and for inputting the determined longitude and latitude position information to the second means; and fifth means for determining altitude position information and for inputting the determined altitude position information to the second means.

55. The position guidance apparatus of claim 54, wherein the fourth means includes a global positioning signal receiver and the fifth means includes an altimeter.

56. The position guidance apparatus of claim 11, further comprising:

keypad means for inputting instruction information indicating a start operation and providing an instruction to the second means to begin receipt of input position information and for inputting instruction information indicating an end operation and providing an instruction to the second means to stop receipt of a portion of the input position information.

57. The interactive position guidance apparatus of claim 39, further comprising:

fourth means for determining longitude and latitude position information and for inputting the determined longitude and latitude position information to the second means; and fifth means for determining altitude position information and for inputting the determined altitude position information to the second means.

58. The interactive position guidance apparatus of claim 57, wherein the fourth means includes a global positioning signal receiver and the fifth means includes an altimeter.

59. The interactive position guidance apparatus of claim 31, further comprising:

keypad means for inputting instruction information indicating a start operation and providing an instruction to the second means to begin receipt of input position information and for inputting instruction information indicating an end operation and providing an instruction to the second means to stop receipt of a portion of the input position information.

60. The position guidance apparatus of claim 1, wherein the current position and predicted destination position are redetermined and redisplayed each time the second means receives input position information.

61. The position guidance method of claim 12, wherein the current position and predicated destination position are redetermined and redisplayed each time input position information is received.

62. The position guidance method of claim 12, wherein the destination prediction information is jump profile information.

* * * * *